(12) United States Patent
Kaneko et al.

(10) Patent No.: US 6,891,141 B2
(45) Date of Patent: May 10, 2005

(54) SURVEYING INSTRUMENT HAVING AN OPTICAL DISTANCE METER AND AN AUTOFOCUS SYSTEM, AND A SURVEYING INSTRUMENT HAVING A DETACHABLE AUTOFOCUS SYSTEM

(75) Inventors: Kenji Kaneko, Tokyo (JP); Shinichi Suzuki, Saitama (JP); Homu Takayama, Saitama (JP); Tadahisa Hoshino, Tokyo (JP); Takanori Yachi, Tokyo (JP); Masayuki Ueno, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/808,351

(22) Filed: Mar. 25, 2004

(65) Prior Publication Data

US 2004/0178322 A1 Sep. 16, 2004

Related U.S. Application Data

(62) Division of application No. 09/938,663, filed on Aug. 27, 2001, now Pat. No. 6,734,410.

(30) Foreign Application Priority Data

Aug. 30, 2000 (JP) ........................................ 2000-261075
Sep. 11, 2000 (JP) ........................................ 2000-274365

(51) Int. Cl.[7] .............................................. G02B 27/40
(52) U.S. Cl. .................... 250/201.2; 356/624; 359/426
(58) Field of Search ........................... 250/201.2, 201.1, 250/201.4, 201.7, 206.1, 239; 356/624; 359/426, 429, 399, 823; 396/79, 80, 94, 111, 121

(56) References Cited

U.S. PATENT DOCUMENTS

| | | | |
|---|---|---|---|
| 5,796,517 A | * | 8/1998 | Sensui et al. ............... 359/426 |
| 5,872,661 A | | 2/1999 | Suzuki et al. |
| 5,877,892 A | | 3/1999 | Nakamura et al. |
| 5,923,468 A | | 7/1999 | Tsuda et al. |
| 5,936,736 A | | 8/1999 | Suzuki et al. |
| 6,072,642 A | | 6/2000 | Shirai |
| 6,194,694 B1 | * | 2/2001 | Shirai ...................... 250/201.2 |
| 6,266,911 B1 | | 7/2001 | Suzuki |
| 6,269,580 B1 | | 8/2001 | Suzuki |

* cited by examiner

*Primary Examiner*—Thanh X. Luu
*Assistant Examiner*—Seung C. Sohn
(74) *Attorney, Agent, or Firm*—Greenblum & Bernstein, P.L.C.

(57) ABSTRACT

A surveying instrument includes a sighting telescope optical system, a distance measuring system which outputs first data, a phase detection autofocus system which and outputs second data, and an AF driver which moves a focusing lens of the sighting telescope optical system to bring the sighting object into focus in accordance with one of the first data and the second data. A surveying instrument is also disclosed, which includes a sighting telescope and an AF drive unit which is provided separately from the sighting telescope, wherein the AF drive unit can be mounted to and dismounted from a body of the surveying instrument.

15 Claims, 15 Drawing Sheets

SURVEYING INSTRUMENT HAVING AN OPTICAL DISTANCE METER AND AN AUTOFOCUS SYSTEM, AND A SURVEYING INSTRUMENT HAVING A DETACHABLE AUTOFOCUS SYSTEM

This is a divisional of U.S. application Ser. No. 09/938,663, filed Aug. 27, 2001 now U.S. Pat. No. 6,734,410, the contents of which are hereby incorporated herein by reference in their entireties.

BACKGROUND OF THE INVENTION

1. Field of the Invention

The present invention relates to a surveying instrument having an optical distance meter and an autofocus system which moves the focusing lens of the sighting telescope in accordance with the location of the sighting object, and also relates to a surveying instrument having a detachable autofocus system.

2. Description of the Related Art

When a surveyor measures the distance between two points with a surveying instrument such as a total station, a reflecting prism such as a corner cube is often used together with the surveying instrument. After the operator of the surveying instrument directs the sighting telescope to the reflecting prism and sights the reflecting prism through the sighting telescope, the distance measuring system (EDM) incorporated in the surveying instrument starts operating at the push of a distance measurement start button provided on the surveying instrument. Upon the commencement of the operation of the distance measuring system, a measuring light such as laser beam is projected from the surveying instrument toward the reflecting prism, and is reflected thereby to be eventually received by a light-receiving sensor in the surveying instrument. The distance measuring system calculates the distance to the reflecting prism via the phase difference between the projecting light and the received light.

A surveying instrument such as a total station is generally provided with a sighting telescope. Conventionally, the focusing lens of the sighting telescope is manually moved to focus the sighting telescope on a sighting object such as a reflecting prism. However, in recent years, surveying instruments equipped with an autofocus system which automatically moves the focusing lens to an in-focus position with respect to the sighting object have been proposed and developed.

With this type of surveying instrument equipped with an autofocus system, the sighting object is brought into focus automatically at the push of an AF start button after the operator aims the sighting telescope at the sighting object.

In a surveying instrument equipped with a phase detection type autofocus system, it is sometimes the case that the sighting object is unable to be brought into focus if the sighting object is like a white wall having no contrast, or a reflecting prism such as a corner cube.

If the sighting object is unable to be brought into autofocus with the use of reflecting prism, the operator can try to perform the distance measuring operation with the autofocus system without the use of reflecting prism. However, in the case of the distance measuring operation being performed with the autofocus system without the use of reflecting prism, if infrared rays are used as measuring light that is to be projected toward the sighting telescope, the point of reflection of the infrared rays at the point of measurement cannot be visually confirmed, so that the point of measurement cannot be determined precisely.

When a distance measurement such as tracking distance measurement operation (consecutive distance measurement operation) is performed with a surveying instrument such as a total station which is equipped with an autofocus system, the distance measurement operation is performed with the surveying instrument in a manner such as shown in the flow chart in FIG. 9.

Firstly, the specified distance and other design data that are necessary for the tracking distance measurement operation are input to a controller of the surveying instrument via devices such as a design value input device and a measured distance (specified value) input device (step, SA1).

Subsequently, a distance measurement start button is depressed to start the distance measurement operation. For instance, the tracking distance measurement mode is set at the push of the distance measurement start button (step SA2). After the tracking distance measurement mode is set, the measured distance value is determined immediately after the measuring light reflected by the target returns to the surveying instrument, while the measured distance and the deviation between the input design value and the measured distance to the target are indicated on an indicating device.

Subsequently, when the sighting telescope is not aimed at the target, a sighting operation is performed (step SA3). In the sighting operation, the operator manually aims the sighting telescope at the target so that the optical axis of the sighting telescope is generally in line with the target while viewing the target through a collimator (not shown) which is attached to the sighting telescope. If the sighting telescope is in an in-focus state on the target, the operator manually operates the sighting telescope to sight the center of the target via the sighting telescope.

Subsequently, it is determined whether the AF start button is depressed (step SA4). The AF start button is depressed if the operator desires to bring the target into focus after the sighting operation is performed.

The autofocus system starts operating immediately after the AF start button is depressed. After the AF button is depressed, it is determined whether the target is in focus (step SA5). If it is determined that the target is in focus, control proceeds to step SA7.

If it is determined at step SA5 that the target is not in focus, control proceeds to step SA6 at which a focusing lens is automatically moved to a predetermined default position thereof to bring an object at a predetermined distance, which is stored as a default distance value in a conventional default-distance setting device, into focus.

After the target has been brought into focus, the measured distance value is determined while the sighting operation is being performed, and subsequently it is determined whether the measured distance value has been determined (step SA7). Namely, the measured distance value is determined immediately after the measuring light reflected by the target returns to the surveying instrument. Control proceeds to step SA8 if the measured distance value has been determined at step SA7. Control proceeds to step SA9 if the measured distance value has not yet been determined at step SA7.

If it is determined at step SA7 that the measured distance value has been determined the measured distance and the deviation between the input design value (specified distance) and the measured distance to the target are calculated to be indicated on the indicating device (step SA8). Consequently, the operator can identify the deviation between the current location of the target and the staking point by looking at the indicating device. This makes it possible for the operator of the surveying instrument to instruct the worker who holds the target to move the target in accordance with the deviation.

Thereafter, at the moment the deviation indicated on the indicating device becomes zero, the stakeout operation, in which the target is staked out at a staking point, is completed. Accordingly, after the operation at step SA8, it is determined whether a distance measurement stop button is depressed (step SA9) The operator pushes the distance measurement stop button if it is determined that the stakeout operation, in which the target is staked out at a staking point, is completed. If the distance measurement stop button is depressed during the sighting operation, control proceeds to step SA10 and the tracking distance measurement operation is terminated. Otherwise, control returns to step SA4 from step SB9 to repeat the operations from step SB4 to step SB9.

Accordingly, when a distance measurement such as a tracking distance measurement (consecutive distance measurement), consecutive distance stakeout measurement, or lot staking measurement is performed, the AF start button must be pushed frequently while the distance measurement is performed repetitively. However, it is troublesome for the operator to push the AF start button frequently. Furthermore, having to push the AF start button frequently hinders the target tracking operation.

Under such circumstances, it is difficult for the operator to concentrate on the target tracking operation and to finish the target tracking operation promptly with a conventional surveying instrument such as a conventional total station. For instance, if the line of sight of the sighting telescope deviates from the target to thereby make it impossible to bring the target into focus automatically during the stakeout operation, the focusing lens of the sighting telescope is generally moved to be focused on an object at a predetermined distance. However, it is often the case that such a predetermined distance is not at all related to any points for the stakeout operation, which makes it difficult to perform the stakeout operation promptly.

Various types of surveying instruments such as total stations having a sighting telescope have been developed. In a typical surveying instrument, the focusing lens of the sighting telescope is manually moved to adjust the focus of the sighting telescope. In recent years advanced surveying instruments equipped with an autofocus system which drives the focusing lens of the sighting telescope to adjust the focus thereof automatically have been developed.

In order to incorporate such an autofocus system into surveying instrument, it is necessary to provide the surveying instrument with a sensor (e.g., a multi segment CCD line sensor) for gaining information on the focal point of the sighting telescope, a lens driver having gears and a motor which drives the focusing lens of the surveying instrument in accordance with the information on the focal point of the sighting telescope, a controller for controlling the operation of the lens driver, and a hand operated member such as an AF start button to enable activation of the autofocus system.

However, the task of incorporating such an autofocus system into surveying instrument is time-consuming because elements of the autofocus system need to be connected to associated internal elements of the surveying instrument mechanically, electrically and optically. Moreover, the built-in autofocus system generally complicates the internal structure of the surveying instrument, which increases the possibility of the surveying instrument breaking down.

If the built in autofocus system breaks down, it is generally the case that the autofocus system needs to be repaired with one or more exterior covers of the surveying instrument being uncovered. Furthermore, one or more exterior covers of the surveying instrument need to be uncovered even when the autofocus system is inspected. This is obviously a troublesome task.

If such a surveying instrument equipped with an autofocus system and a conventional type surveying instrument equipped with no autofocus system are manufactured at the same time, these two types of surveying instruments normally need to be manufactured in different production lines because the autofocus system cannot be simply separated from the conventional surveying instrument to produce the surveying instrument equipped with an autofocus system. This increases the cost of production.

In conventional surveying instruments equipped with an autofocus system, a battery (a main electric power source) accommodated in the body of the surveying instrument supplies power to a lens drive motor of the autofocus system. Therefore, if battery of the surveying instrument runs out, the lens drive motor is not supplied with power, and consequently the autofocus system becomes dysfunctional.

SUMMARY OF THE INVENTION

The present invention has been devised in view of the problems noted above, and accordingly, an object of the present invention is to provide a reliable and easy operable surveying instrument having an optical distance meter and an autofocus system, which make it possible to complete the stakeout operation promptly and to free the operator from the troublesome frequent operation of the AF start button.

Another object of the present invention is to provide a surveying instrument equipped with an autofocus system which has easy maintainability, and also a unique structure which makes it easy to produce two types of surveying instruments: one type with an autofocus system and the other with no autofocus system, at a low cost of production.

To achieve the first above mentioned object, according to an aspect of the present invention, a surveying instrument is provided, including a sighting telescope optical system through which a sighting object can be sighted; a distance measuring system which measures a distance to the sighting object, and outputs first data; a phase detection autofocus system which detects a focus state of an image of the sighting object on a reference focal plane, and outputs second data; and an AF driver which moves a focusing lens of the sighting telescope optical system to bring the sighting object into focus in accordance with one of the first data and the second data.

Preferably, the surveying instrument further includes a start button, wherein the distance measuring system and the AF driver operate consecutively upon a single-push operation of the start button.

In an embodiment, the surveying instrument further includes a controller which provides a consecutive autofocus mode in which the sighting object is brought into focus automatically consecutively via the AF driver, and a consecutive distance measurement mode in which the distance to the sighting object is consecutively measured via the distance measuring system. The consecutive autofocus mode starts at the same time the consecutive distance measurement mode is started.

In an embodiment, the surveying instrument according to claim 1, further including a controller which drives the AF driver to move the focusing lens to a predetermined position thereof so that an object at a predetermined distance is in focus when the sighting object is unable to be brought into focus in the case of a measurement mode in which a target is set at an arbitrary point.

The surveying instrument can be a total station.

Preferably, the distance measuring system includes a distance meter having a light-emitting element and a light-receiving element.

Preferably, the phase detection autofocus system includes a pair of line sensors.

According to another aspect of the present invention, a surveying instrument is provided, including a sighting telescope optical system through which a sighting object can be sighted; a distance measuring system which measures a distance to the sighting object; and a phase detection autofocus system which detects a focus state of an image of the sighting object on a reference focal plane; and an AF driver which moves a focusing lens of the sighting telescope optical system to bring the sighting object into focus in accordance with an output of the phase detection autofocus system.

In an embodiment, the AF driver can move the focusing lens to bring the sighting object into focus in accordance with an output of the phase detection autofocus system without the use of a reflective device at a point of the sighting object.

In an embodiment, the surveying instrument includes a start button, wherein the distance measuring system and the AF driver operate consecutively upon a single-push operation of the start button.

In an embodiment, the surveying instrument further includes a controller which provides a consecutive autofocus mode in which the sighting object is brought into focus automatically consecutively via the AF driver, and a consecutive distance measurement mode in which the distance to the sighting object is consecutively measured via the distance measuring system. The consecutive autofocus mode starts at the same time the consecutive distance measurement mode is started.

In an embodiment, the surveying instrument further includes a controller which drives the AF driver to move the focusing lens to a predetermined position thereof so that an object at a predetermined distance is in focus when the sighting object is unable to be brought into focus in the case of a measurement mode in which a target is set at an arbitrary point.

The surveying instrument can be a total station.

Preferably, the distance measuring system includes a distance meter having a light-emitting element and a light-receiving element.

Preferably, the phase detection autofocus system includes a pair of line sensors.

To achieve the second above-mentioned object, according to an aspect of the present invention, a surveying instrument is provided, including a sighting telescope through which a sighting object can be sighted; and an AF drive unit which is provided separately from the sighting telescope, wherein the AF drive unit can be mounted to and dismounted from a body of the surveying instrument. The AF drive unit includes a sensor which receives part of a light bundle which is passed through an objective lens of the sighting telescope; a drive mechanism which drives a focusing lens group of the sighting telescope along an optical axis thereof; a controller which inputs sensor data output from the sensor to control the operation of the drive mechanism in accordance with the input sensor data so as to focus the sighting telescope on the sighting object; and a driving force transmitting device which transmits a driving force generated by the drive mechanism to the focusing lens group in a state where the AF drive unit is mounted to the body of the surveying instrument.

Preferably, the surveying instrument further includes a light guide, provided between the AF drive unit and the body of the surveying instrument, for guiding the part of the light bundle which is passed through the objective lens to the sensor.

In an embodiment, the light guide includes a first aperture formed on the body of the surveying instrument and a second aperture formed on a body of the AF drive unit, the first aperture and the second aperture being aligned so that the part of the light bundle can travel from inside of the body of the surveying instrument to the sensor via the first and second apertures.

Preferably, the AF drive unit includes a focus control portion which is manually operated to control the operation of the drive mechanism.

In an embodiment, the focus control portion includes an AF start button, the controller performing an autofocus operation upon the AF start button being depressed.

In an embodiment, the focus control portion is positioned in the vicinity of an eyepiece of the sighting telescope.

In an embodiment, at least one of the drive mechanism and the AF controller is supplied with power from a battery accommodated in the AF drive unit.

In an embodiment, the body of the surveying instrument includes a manual focus system with which the focusing lens group can be manually moved to adjust a focal point of the sighting telescope.

In an embodiment, the body of the surveying instrument includes a motorized manual focus system with which the focusing lens group can be manually moved by operating at least one hand-operated member to adjust a focal point of the sighting telescope.

Preferably, the body of the surveying instrument includes the sighting telescope.

The surveying instrument can be a total station.

Preferably, the driving force transmitting device includes a first gear provided in the AF drive unit, the first gear partly projecting out of the AF drive unit; and a second gear provided in the body of the sighting telescope. The first gear and the second gear mesh with each other in a state where the AF drive unit is mounted to the body of the surveying instrument.

In an embodiment, the second gear partly projects out of the body of the surveying instrument.

In an embodiment, the body of the surveying instrument includes the sighting telescope, the sighting telescope includes an erecting optical system positioned behind the focusing lens group, and the light guide includes a beam splitting optical member attached to a surface of the beam splitting optical member.

Preferably, the erecting optical system includes a Porro-prism.

The present disclosure relates to subject matter contained in Japanese Patent Applications Nos. 2000-261075 (filed on Aug. 30, 2000) and 2000-274365 (filed on Sep. 11, 2000) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
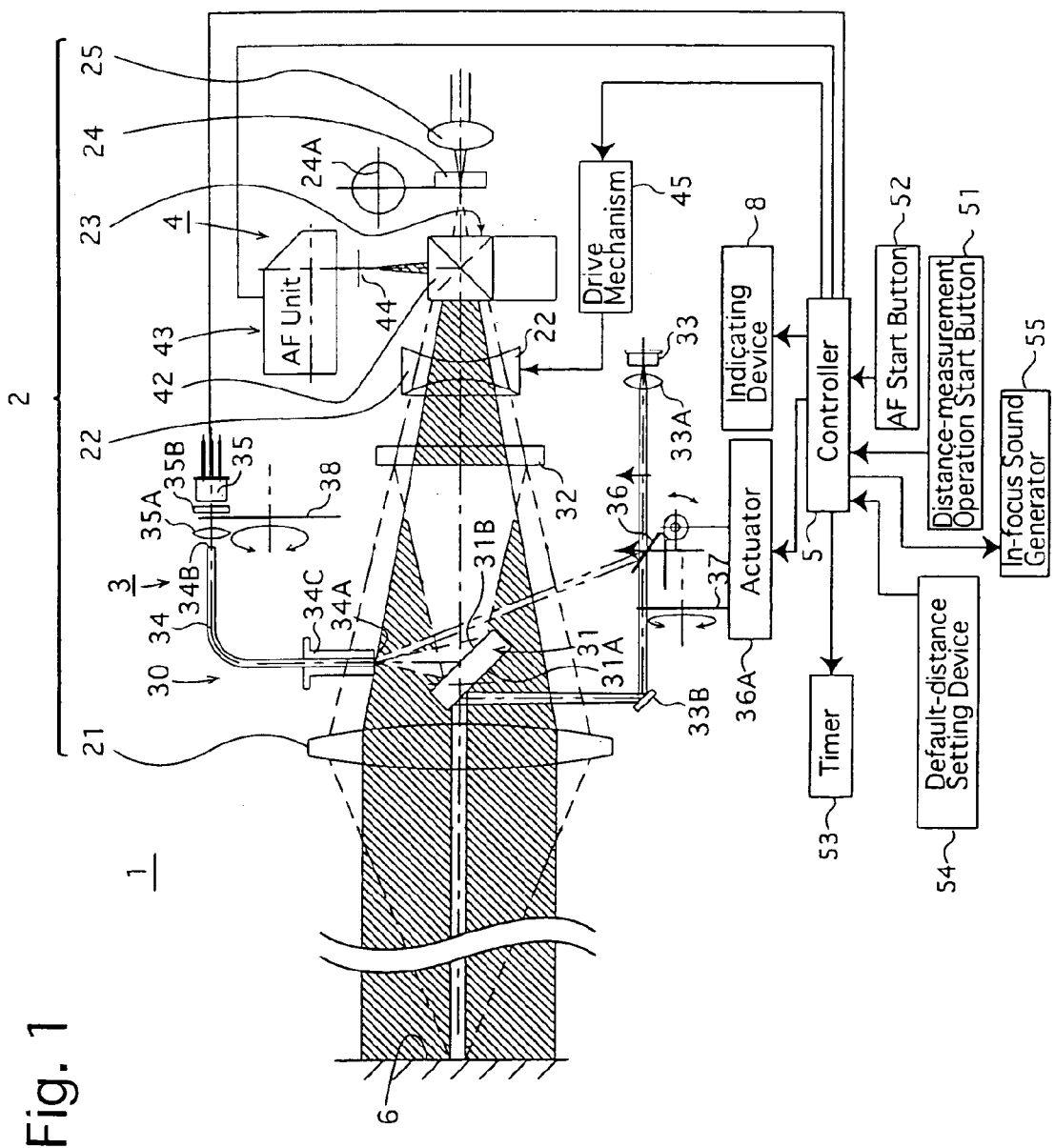
FIG. 1 is a schematic diagram of the first embodiment of a total station equipped with an autofocus system, according to the present invention.

FIG. 1 shows the first embodiment of a total station (a surveying instrument) equipped with an autofocus system. The first embodiment of the total station 1 is provided with an optical system 2, a distance measuring system (EDM) 3, an angle measuring system (not shown), an autofocus system 4, and a controller 5. The optical system 2 includes a sighting telescope optical system.

The optical system 2 is provided with an objective lens 21, a focusing lens (focus adjustment lens) 22, a Porro-prism erecting system 23, a focal plane plate (reticle plate) 24, and an eyepiece lens 25, in that order from the object side (i.e., left to right as shown in FIG. 1). These optical elements 21, 22, 23, 24 and 25 are fundamental optical elements of the sighting telescope optical system.

The focusing lens 22 is guided in a direction of the optical axis thereof. The axial position of the focusing lens 22 is automatically adjusted via a drive mechanism (AF driver) 45 of the autofocus system 4 in accordance with the distance to a sighting object 6 to focus the image of the sighting object 6 that is formed through the objective lens 21 on the front surface (the surface facing the objective lens 21) of the focal-plane plate 24. Accordingly, the image of the sighting object 6 can be precisely focused on the front surface of the focal plane plate 24 by automatically adjusting the axial position of the focusing lens 22 in accordance with the distance to the sighting object 6. The operator sights a magnified image of the sighting object 6, which is focused on the focal-plane plate 24, via the eyepiece 25.

The focusing lens 22 is driven either automatically via the drive mechanism 45 of the autofocus system 4 or manually via a manual focus (MF) system (not shown) or a motorized power focus system (i.e., a motorized manual focus system). The drive mechanism 45 is provided therein with a lens drive motor (not shown) for moving the focusing lens 22.

The Porro-prism erecting system 23 is of a type which employs three right angle prisms having four rectangular reflection surfaces (first through fourth reflection surfaces in that order from the incident light side). A part of the first reflection surface is formed as a semitransparent surface (e.g., a half-silvered surface) which serves as a beam splitting surface, while a specific surface of a beam splitting prism 42 is entirely adhered to the semitransparent surface by an adhesive.

The focal-plane plate 24 is provided thereon with a reticle (collimation axis) 24A.

The distance measuring system 3 offers two modes of distance measurement. In one mode, the operator places a corner cube (reflective device) (not shown) at an aiming point, and thereafter the distance measuring system 3 is set to emit measuring light (e.g., a laser beam) to the corner cube (not shown) and receives the measuring light reflected by the corner cube to measure the distance. In the other mode, the distance measuring system 3 is set to emit the measuring light directly to a sighting object (i.e. without the use of a corner cube) and receives the measuring light reflected by the sighting object to measure the distance. These two modes of distance measurement can be freely selected by the operator in accordance with the type or characteristics of the sighting object 6.

The distance measuring system 3 is provided therein with an optical distance meter 30. The optical distance meter 30 is provided, behind the objective lens 21, with a light transmitting/receiver mirror (reflection member) 31 and a wavelength selection mirror (wavelength selection filter) 32, which are arranged in that order from the object side. The optical distance meter 30 is further provided with a light-emitting element (e.g., a laser diode) 33 which emits light (measuring light) having a specific wavelength, a light-receiving optical fiber 34, and a light-receiving element 35.

The light transmitting/receiving mirror 31 is made of a parallel-plate mirror having front and rear parallel surfaces positioned on the optical axis of the objective lens 21. The front surface of the parallel-plate mirror which faces the objective lens 21 is formed as a light transmitting mirror 31A, while the rear surface of the parallel-plate mirror which faces the wavelength selection mirror 32 is formed as a light receiving mirror 31B.

The measuring light, emitted from the light-emitting element 33 to be incident on the light transmitting mirror 31A, is reflected thereby to proceed toward the sighting object 6 along the optical axis of the objective lens 21. The measuring light which is reflected by the sighting object 6 to be passed through the objective lens 21 is reflected back to the light receiving mirror 31B via the wavelength selection mirror 32. The light receiving mirror 31B reflects the incident measuring light so as to make the measuring light enter at an incident end surface 34A of the light receiving optical fiber 34. The measuring light emitted from the light-emitting element 33 is incident on the light transmitting mirror 31A via a collimating lens 33A and a fixed mirror 33B.

A fiber holder 34C supports the incident end, of the light receiving optical fiber 34 which has the incident end surface 34A. The fiber holder 34C is immovably supported together with the light transmitting/receiving mirror 31 by a fixing device (not shown) provided in a space behind the objective lens 21.

The optical distance meter 30 is provided between the light emitting element 33 and the fixed mirror 33B, on a distance measuring optical path, with a switching mirror 36 and an optical attenuator 37. The light (measuring light) emitted by the light emitting element 33 is incident on the fixed mirror 33B when the switching mirror 36 is retracted from the distance measuring optical path between the collimating lens 33A and the fixed mirror 33B, and the light (internal reference light) emitted by the light-emitting element 33 is reflected by the switching mirror 36 to be incident directly on the incident end surface 34A of the light receiving optical fiber 34 when the switching mirror 36 is positioned in the distance measuring optical path between the collimating lens 33A and the fixed mirror 33B. The optical attenuator 37 is used to adjust the amount of light of the measuring light incident on the sighting object 6.

The optical distance meter 30 is provided, between an exit end surface 34B of the light receiving optical fiber 34 and the light-receiving element 35, with a condenser lens 35A, an optical attenuator 38 and a band-pass filter 35B, in that order from the exit end surface 34B to the light-receiving element 35. The light-receiving element 35 is connected to a controller 5. The light-receiving element 35 is connected to the controller 5. The controller 5 is connected to an actuator, 36A which drives the switching mirror 36, and an indicating device (e.g., an LCD panel) 8 which indicates the calculated distance.

The light bundles which are respectively passed through two pupil areas on the objective lens 21 pass through optical paths which do not interfere with fundamental elements of the optical distance meter 30 such as the light transmitting/receiving mirror 31, and the light receiving optical fiber 34, the fiber holder 34C, and supporting and/or fixing members (not shown) for these elements.

As known in the art, the optical distance meter 30 establishes two different states: one state wherein the measuring light emitted by the light-emitting element 33 is supplied to the fixed mirror 33B, and another state wherein the same light (internal reference light) is directly supplied to the incident end surface 34A of the light-receiving optical fiber 34, which are determined in accordance with the switching state of the switching mirror 36 driven by the controller 5 via the actuator 36A.

As described above, the measuring light supplied to the fixed mirror 33B is projected toward the sighting object 6 via the light-transmitting mirror 31A and the objective lens 21, and the measuring light reflected by the sighting object 6 is incident on the incident end surface 34A via the objective lens 21, the wavelength selection mirror 32, and the light receiving mirror 31B.

Thereafter, both the measuring light reflected by the sighting object 6 to be eventually incident on the incident end surface 34A, and the internal reference light directly supplied to the incident end surface 34A via the switching mirror 36 are received by the light-receiving element 35.

The light-receiving element 35 which receives the measuring light and the internal reference light outputs a signal to the controller 5.

The controller 5 having received such a signal from the light-receiving element 35 detects the phase difference between the projecting light (the measuring light projected outwards) and the reflected light (the measuring light reflected by the sighting object 6) and the initial phase of the internal reference light to calculate the distance (distance data/first data) from the location of the total station to the sighting object 6. The calculated distance (distance data/first data) is indicated by the indicating device 8.

The beam splitting prism 42, an AF sensor unit 43 which includes a pair of line sensors (e.g., multi-segment CCD sensors) 43C (see FIG. 2) that receive the light reflected by the Porro-prism erecting system 23, and the drive mechanism 45 of the autofocus system 4 are fundamental elements of the autofocus system 4.

A part of the light which enters the Porro-prism erecting system 23 enters the beam splitting prism 42 to be reflected thereby to proceed toward a reference focal plane 44.

Figure 2:
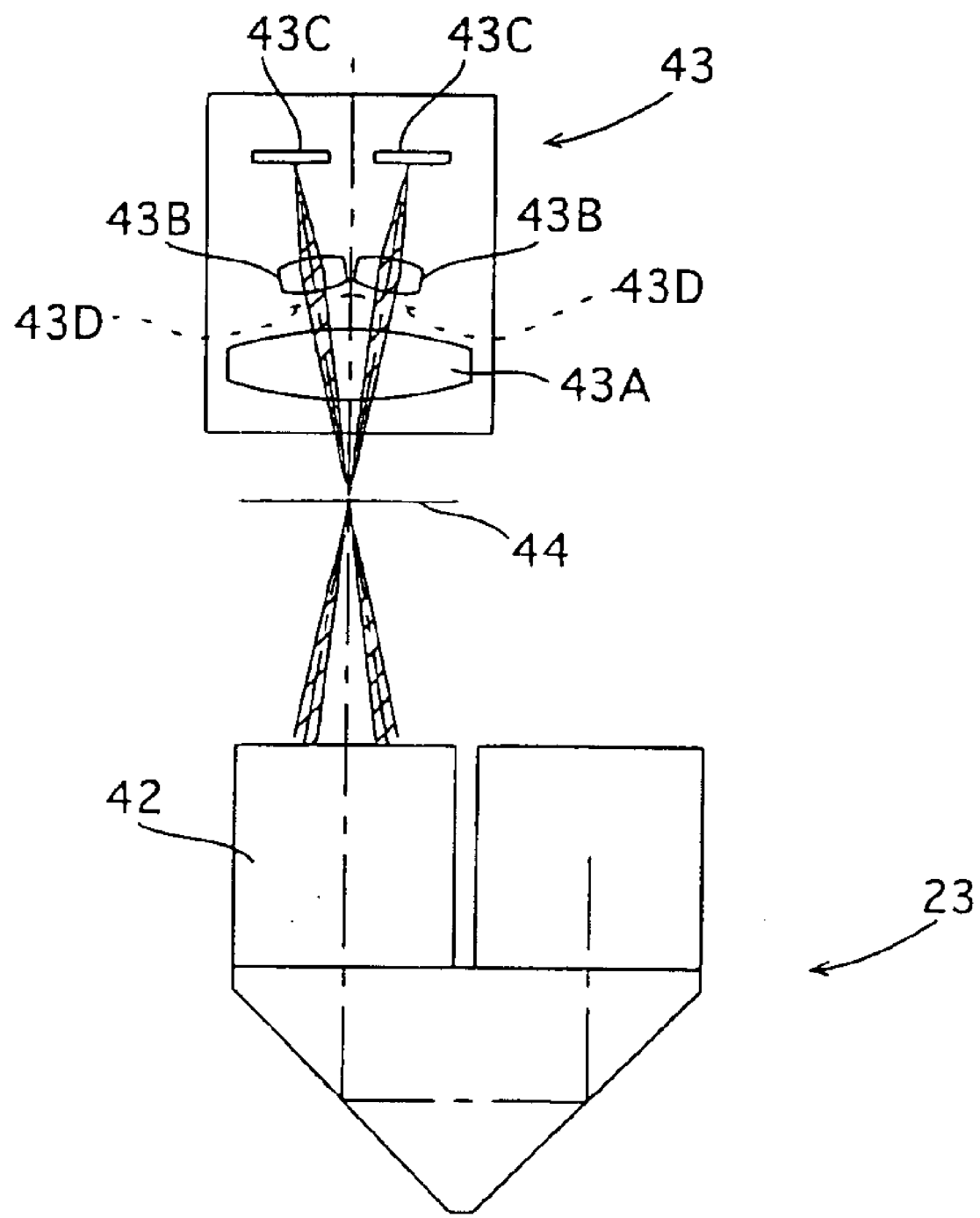
FIG. 2 is a conceptual diagram of a focus detecting device and a Porro-prism erecting system which are shown in FIG. 1.

The reference focal plane 44 is formed between the beam splitting prism 42 and the AF sensor unit 43, and is located at a position optically equivalent to the position at which the reticle 24A of the focal-plane plate 24 is placed. The AF sensor unit 43 utilizes a phase difference detecting method, and detects the focus state (e.g., a front focus or a rear focus) on the reference focal plane 44. FIG. 2 shows a conceptual diagram of the AF sensor unit 43 and the Porro-prism erecting system 23. The AF sensor unit 43 includes a condenser lens 43A, a pair of separator lenses (image-forming lenses) 43B, a pair of separator masks 43D located in the close vicinity of the pair of separator lenses 43B, and the aforementioned pair of line sensors 43C located behind the respective separator lenses 43B. The hatched areas (see FIG. 1) conceptually indicate areas (optical paths) which correspond to the pair of pupil areas determined by a pair of apertures respectively formed on the pair of separator masks, 43D. The pair of separator lenses 43B are arranged apart from each other by the base length. The image of the sighting object 6 formed on the reference focal plane 44 is separated into two images by the pair of separator lenses 43B to be respectively formed on the pair of line sensors 43C. Each of the pair of line sensors 43C includes an array of photoelectric converting elements. Each photoelectric converting element converts the received light of an image into electric charges which are integrated (accumulated), and outputs as an integrated electric charge to the controller 5 to constitute AF sensor data (positional data/second data). The controller 5 calculates an amount of defocus and direction of the focal shift through a predetermined defocus operation in accordance with a pair of AF sensor data respectively input from the pair of line sensors 43C.

As shown in FIG. 1, the autofocus system 4 is provided with an AF start button 52 connected to the controller 5. The autofocus system 4 offers two autofocus modes: a one-shot autofocus mode in which the controller 5 performs an autofocus operation only once, by which the focusing lens 22 is automatically moved to an in-focus position with respect to the sighting object 6, and a consecutive autofocus mode in which the controller 5 performs the autofocus operation more than one time in series (i.e., a consecutive autofocus operation). The operator can select either the one-shot autofocus mode or the consecutive autofocus mode at the push of the AF start button 52. For instance, the one-shot autofocus mode and the consecutive autofocus mode are selected when the AF start button 52 is depressed once, and twice in a row, respectively. Alternatively, the one-shot autofocus mode and the consecutive autofocus mode can be selected when the AF start button 52 is depressed for a short time and a long time, respectively.

In the one-shot autofocus mode, which can be set, e.g., with a double-push operation of the AF start button 52, predetermined arithmetic computations and controls are performed only once in accordance with the AF sensor data output from the AF sensor unit 43 to move the focusing lens 22 to an in-focus position with respect to the sighting object 6. At this time, if the sighting object 6 is in focus, the total station delivers an audible signal via a sound generator 55 to inform the operator of the in-focus state. Subsequently, the power of the autofocus system 4 is turned OFF automatically upon completion of the autofocus operation. The sound generator 55 is connected to the controller 5.

On the other hand, in the consecutive autofocus mode, which can be set, e.g., with a single-push operation of the AF start button 52, the same predetermined arithmetic computations and controls are performed more than once in series in accordance with the AF sensor data output from the AF sensor unit 43 to move the focusing lens 22 to an in-focus position with respect to the sighting object 6 each time the predetermined arithmetic computations and controls are performed. Therefore, in the consecutive autofocus mode, the sighting object 6 is brought into focus repetitively even if the sighting object 6 is moving. In this case, the audible sound is generated each time the sighting object 6 is in focus. Thereafter, the power of the autofocus system 4 is turned OFF automatically upon completion of the last autofocus operation.

The controller 5 uses either a phase difference method using the aforementioned positional data in which the separation of the pair of images respectively formed on the pair of line sensors 43C is phase-detected, or another phase difference method using the aforementioned distance data generated via the distance measuring system 3 to bring the sighting object into focus automatically in accordance with type or characteristics of the sighting object 6. In the present embodiment, input terminals of the controller 5 are connected with output terminals of the AF sensor unit 43 and the light-receiving element 35 of the distance measuring system 3, while output terminals of the controller 5 are connected with the actuator 36A for driving the switching mirror 36 and the indicating device 8.

Accordingly, the controller 5 operates to move the focusing lens 22 to an in-focus position via the drive mechanism 45 of the autofocus system 4 in accordance with the 'distance data' generated by the distance measuring system 3, or calculates an amount of defocus via a predetermined defocus operation in accordance with a pair of AF sensor data ('positional data') respectively input from the pair of line sensors 43C to drive the focusing lens 22 so as to bring the sighting object 6 into focus via the drive mechanism 45 in accordance with the calculated amount of defocus. If the controller 5 determines that both the distance data and the positional data are reliable, the controller 5 operates to perform the autofocus operation in accordance with the distance data, which is generally considered more reliable than the positional data, in accordance with a data table shown in; Table 1 below.

The total station 1 is further provided with a distance measurement start button 51, a timer 53 and a default-distance setting device 54 which are all connected to the controller 5.

TABLE 1

| | Pattern | | Data used for AF Operation | Judgement |
|---|---|---|---|---|
| (1) | Positional Data OK | Distance Data OK | Distance Data | In-focus |
| (2) | Positional Data FAILED | Distance Data OK | Distance Data | In-focus |
| (3) | Positional Data OK | Distance Data FAILED | Positional Data | In-focus |
| (4) | Positional Data FAILED | Distance Data FAILED | NONE | Unable to Focus |

An arbitrary/design distance can be set/stored in the default-distance setting device 54. If the positional data output from the AF sensor unit 43 represents an unable-to-focus state after the aforementioned autofocus 10 operation has been performed, the controller 5 actuates the lens driver 45 to move the focusing lens 22 to a predetermined position to bring an object at the corresponding arbitrary/design distance that is stored in the default-distance setting device 54 into focus in either autofocus mode (the one-shot autofocus mode or the consecutive autofocus mode) before the subsequent autofocus operation is performed.

Figure 3:
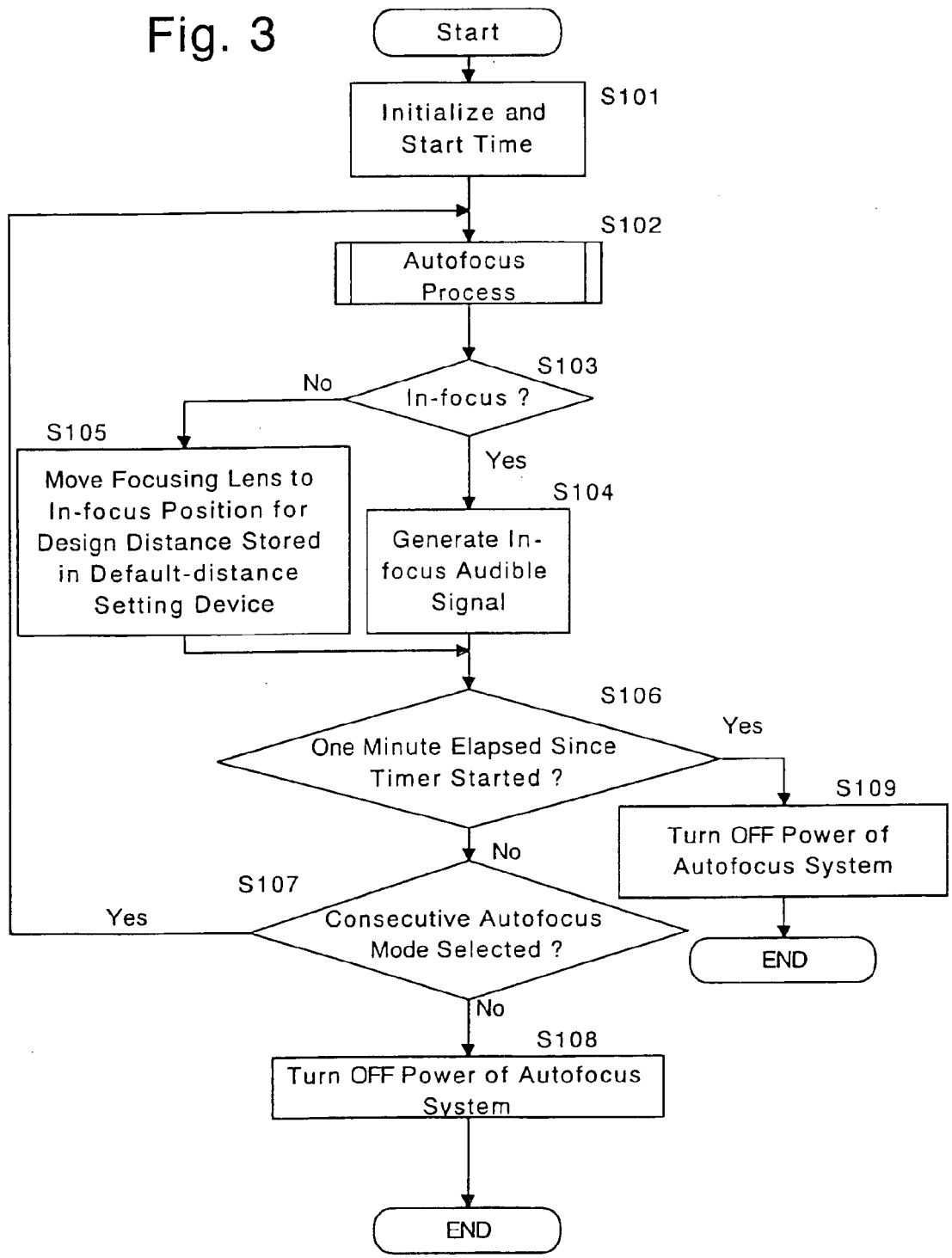
FIG. 3 is a flow chart for a main routine which is performed at the push of an AF start button.
Figure 4:
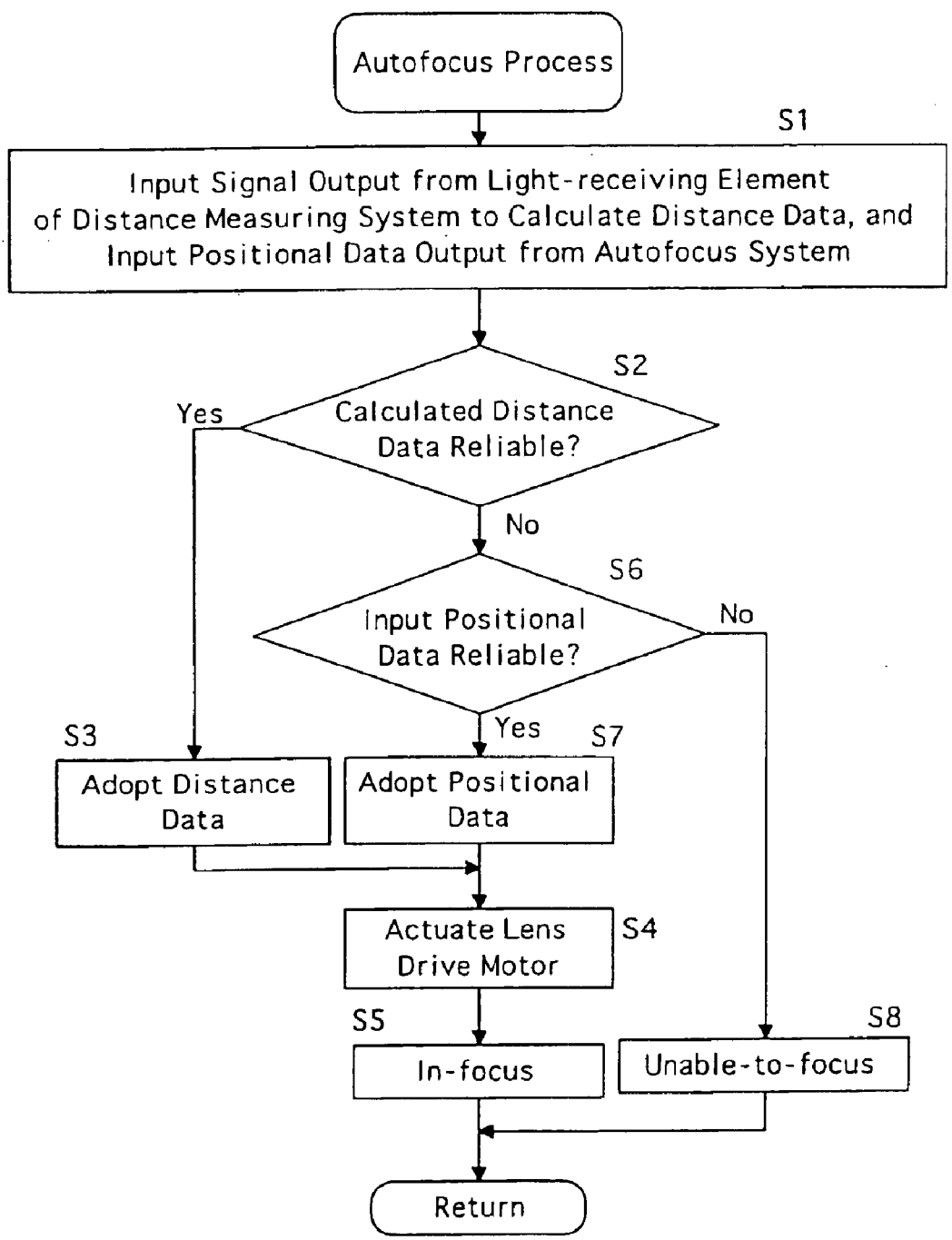
FIG. 4 is a flow chart for a subroutine "Autofocus Process" shown in FIG. 3.

The process of bringing the sighting object 6 into focus will be hereinafter discussed with reference to the flow charts shown in FIGS. 3 and 4. FIG. 3 is a flow chart of a main routine which is performed at the push of the AF start button 52 (with a single-push or a double-push operation of the AF start button 52), and FIG. 4 is a flow chart for an autofocus process ("Autofocus Process" shown in FIG. 3) in which the autofocus operation is performed.

Control enters the main routine immediately after the AF start button 52 is depressed one or twice in a row.

In the main routine, firstly the timer 53 is initialized and started (step S101). Subsequently, the autofocus process shown in FIG. 4 is performed (step S102). Subsequently, it is determined whether the sighting object 6 is in-focus (step S103). If the sighting object is in-focus, the sound generator 55 generates an audible signal (step S104). If the sighting object is unable to be brought into focus, the focusing lens 22 is driven to move to a predetermined position thereof to bring an object at the corresponding arbitrary/design distance that is stored in the default-distance setting device 54 into focus (step S105).

Subsequently, it is determined whether a predetermined period of time (e g., one minute) has elapsed since the timer 53 started (step S106). If one minute has not yet elapsed, it is determined whether the AF start button 52 was depressed twice in a row, i.e., whether the consecutive autofocus mode has been selected by the operator (step S107). If the AF start button 52 was depressed only once, i.e., if the one-shot autofocus mode has been selected by the operator, the power of the autofocus system 4 is turned OFF (step S108) and subsequently control ends. If it is determined at step S106 that one minute has elapsed, control proceeds to step S109 at which the power of the autofocus system 4 is turned OFF and subsequently control ends.

If it is determined at step S107 that the AF start button 52 was depressed twice in a row, i.e., that the consecutive autofocus mode has been selected by the operator, control returns to step S102 to perform the autofocus process.

Accordingly, in the consecutive autofocus mode, the autofocus process is performed repeatedly until the timer 53 expires.

The autofocus process at step S102 in FIG. 3 will be hereinafter discussed with reference to the flow chart shown in FIG. 4.

In the autofocus process, firstly the signal output from the light-receiving element 35 of the autofocus system 4, and the AF sensor data (the positional data) output from the pair of line sensors 43C of the AF sensor unit 43 of the distance measuring system 4 are input to the controller 5, while the distance data is calculated from the signal output from the light-receiving element 35 (step S1). Subsequently, it is determined whether the calculated distance data is reliable (step S2). If the distance data is deem reliable, i.e., as in the case of patterns (1) or (2) shown in Table 1, control proceeds to step S3. At step S3, the controller 5 adopts the calculated distance data to perform the autofocus operation. Thereafter, the controller 5 actuates the lens drive motor of the drive mechanism 45 to move the focusing lens 22 to a predetermined position in accordance with the distance data (step S4).

As a result, the sighting object 6 is brought into focus via the focusing lens 22 having been moved to the predetermined position (step S5). Subsequently, control returns to the main routine.

However, if it is determined at step S2 that the calculated distance data is not reliable, i.e., as in the case of patterns (3) or (4) shown in Table 1, control proceeds to step S6 at which it is determined whether the positional data is reliable.

If it is determined that the positional data is reliable, i.e., in the case of pattern (3) shown in Table 1, control proceeds to step S7. At step S7, the controller 5 adopts the positional data to perform the autofocus operation. Subsequently, the controller 5 actuates the lens drive motor of the drive mechanism 45 to move the focusing lens 22 to a predetermined position in accordance with the positional data (step S4). As a result, the sighting object 6 is brought into focus via the focusing lens 22 having been moved to the predetermined position (step S5). Subsequently, control returns to the main routine.

If it is determined at step S6 that the positional data is not reliable, i.e., as in the case of pattern (4) shown in Table 1, control proceeds to step S8 at which it is determined that both the distance data and the positional data are not available (i.e., the sighting object is unable to be brought into focus), so that control returns to the main routine. In this case, at step S105 of FIG. 3, the focusing lens 22 is driven so as to bring an object at the corresponding arbitrary/design distance that is stored in the default-distance setting device 54 into focus.

Figure 5:
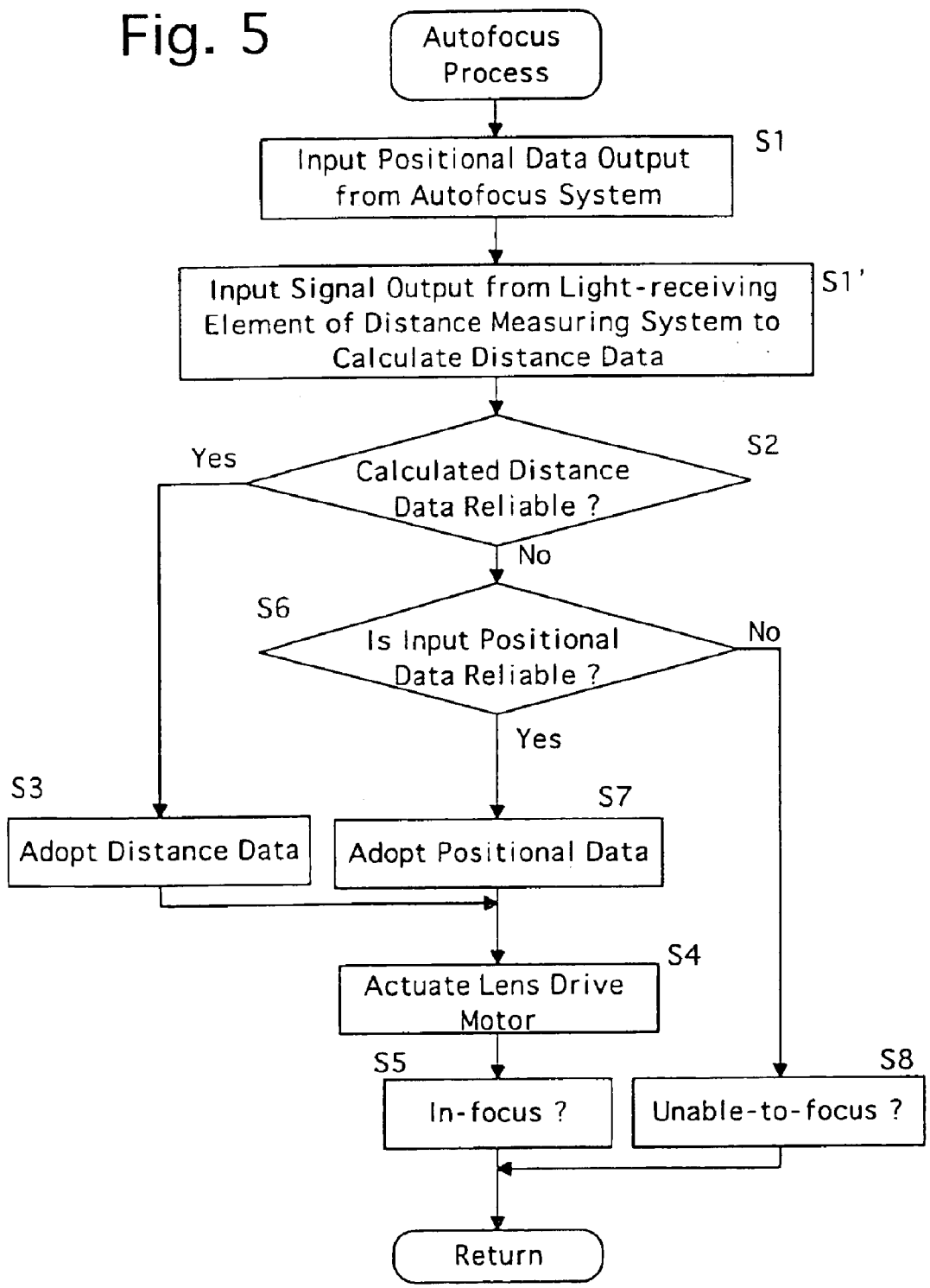
FIG. 5 is a flow chart for another embodiment of the subroutine "Autofocus Process" shown in FIG. 3.
Figure 6:
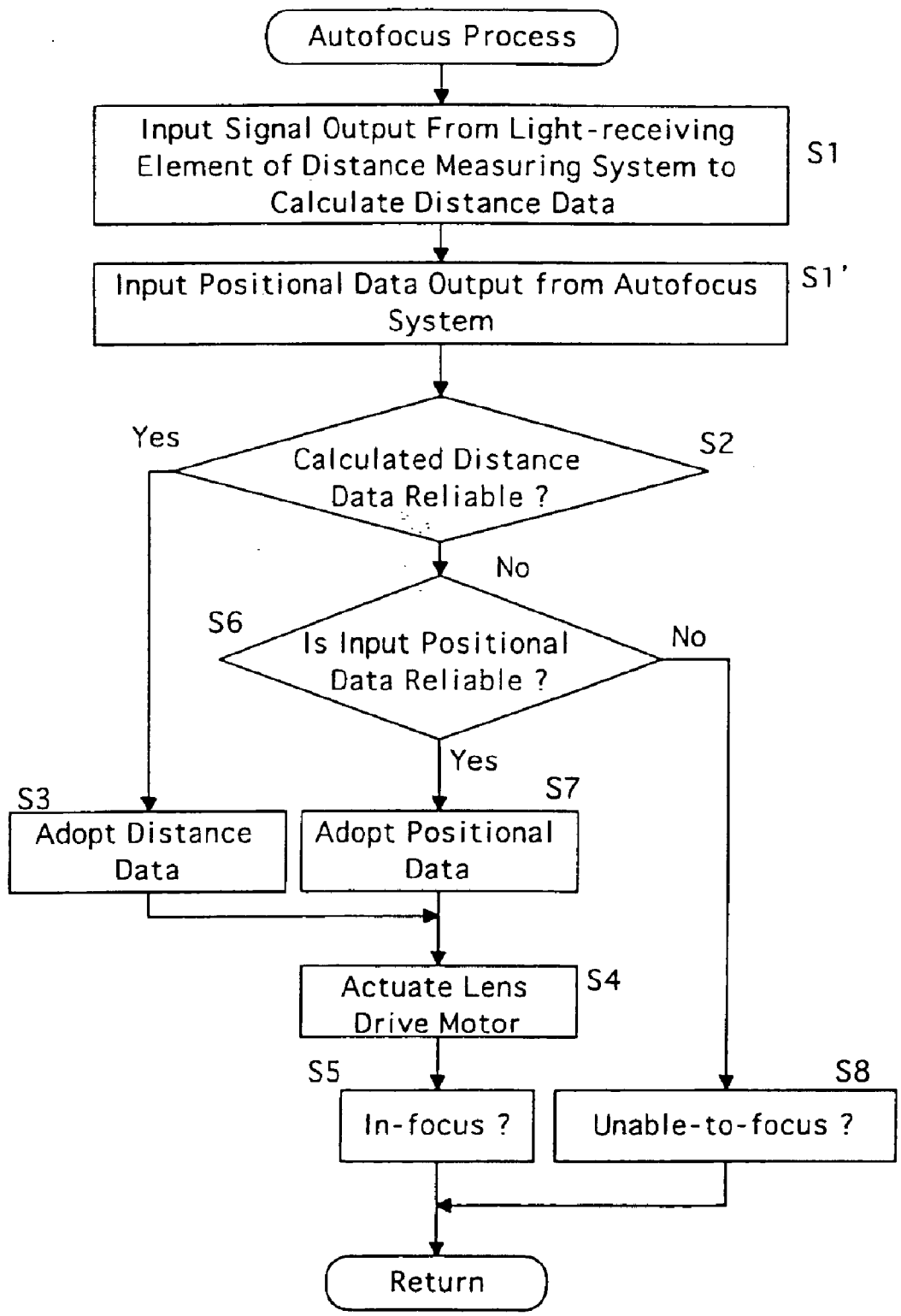
FIG. 6 is a flow chart for another embodiment of the subroutine "Autofocus Process" shown in FIG. 3.

In the above illustrated embodiment of the autofocus process shown in FIG. 4, although the distance data and the positional data are obtained at the same time at step S1, the positional data and the distance data can be obtained in that order as shown in the flow chart in FIG. 5, or the distance data and the positional data can be obtained in that order as shown in the flow chart in FIG. 6 since the reliability of the distance data and the positional data are not determined at the same time.

As can be understood from the above descriptions, according to the process shown in FIGS. 3 and 4, if reliable distance data calculated via the distance measuring system 3 is obtained, the autofocus operation can be carried out using the distance data rather than the positional data since the distance data is generally more reliable than the positional data. Therefore, the sighting object 6 can be brought into focus surely and precisely even if the sighting object 6 is like a white wall having no contrast. Furthermore, even if the sighting object 6 is positioned at a location beyond the predetermined measurement range of the distance measuring system 3, the sighting object 6 can be brought into focus via the autofocus system 4 with a phase difference method using the positional data (AF sensor data) output from the AF sensor unit 43.

Figure 7:
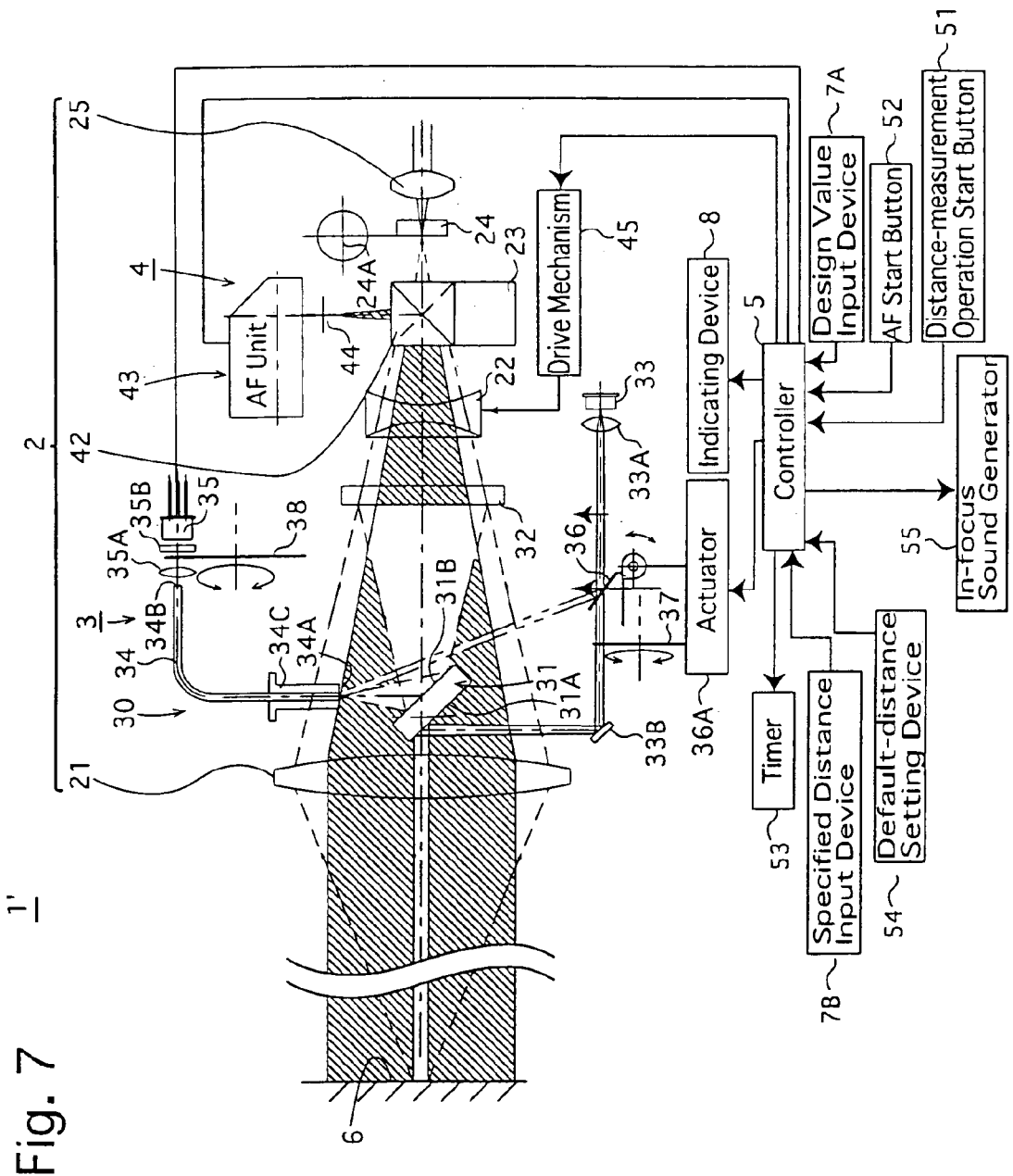
FIG. 7 is a schematic diagram of the second embodiment of the total station equipped with an autofocus system, according to the present invention.

FIG. 7 shows the second embodiment of the total station equipped with an autofocus system. The structure of the second embodiment of the total station 1' is similar to that of the first embodiment of the total station 1 except that the second embodiment of the total station 1' is further provided with a design value input device 7A and a measured distance (specified value) input device 7B which are each connected to the corresponding input terminal of the controller 5.

Numerical design values are input to the controller 5 via the design value input device 7A. For instance, design values are input via the design value input device 7A in a distance stakeout measurement mode; a specified distance and the dividing number "n" for dividing the specified distance into "n" equal parts are input via the design value input device in a lot staking measurement mode; specified coordinate data is input via the design value input device in a coordinate stakeout measurement mode; and a single distance and width values are input via the design value input device 7A in width stakeout measurement mode.

Measured values are input to the controller 5 via the measured distance (specified value) input device 7B. For instance, a reference distance is input via the measured distance input device 7B in a lot staking measurement mode, while a single distance is input via the measured distance input device 7B in width stakeout measurement mode.

Figure 8:
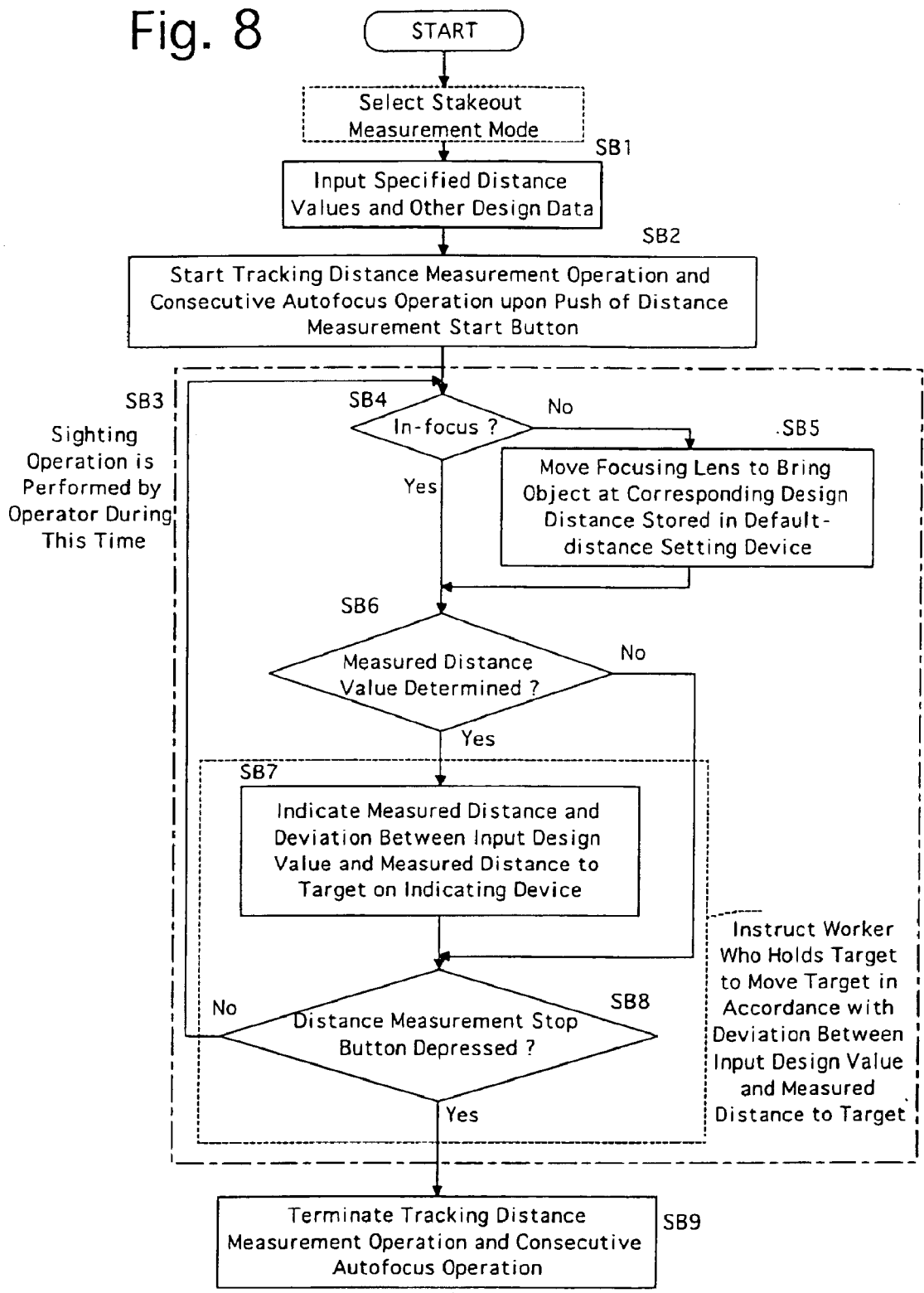
FIG. 8 is a flow chart for a stakeout measurement operation performed on a consecutive basis with the second embodiment of the total station shown in FIG. 7.
Figure 9:
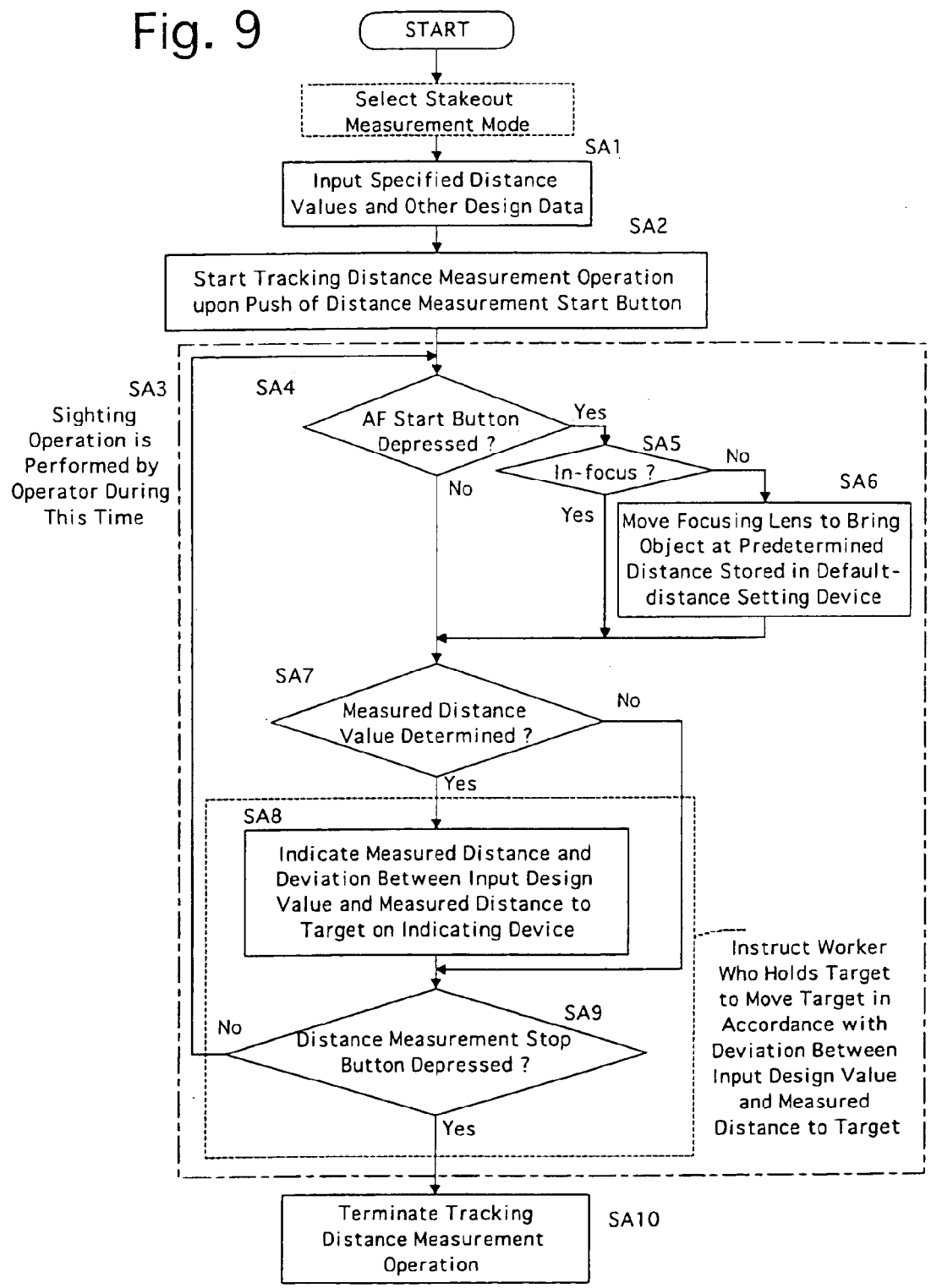
FIG. 9 is a flow chart for a stakeout measurement operation performed on a consecutive basis with a conventional total station equipped with an autofocus system.
Figure 10:
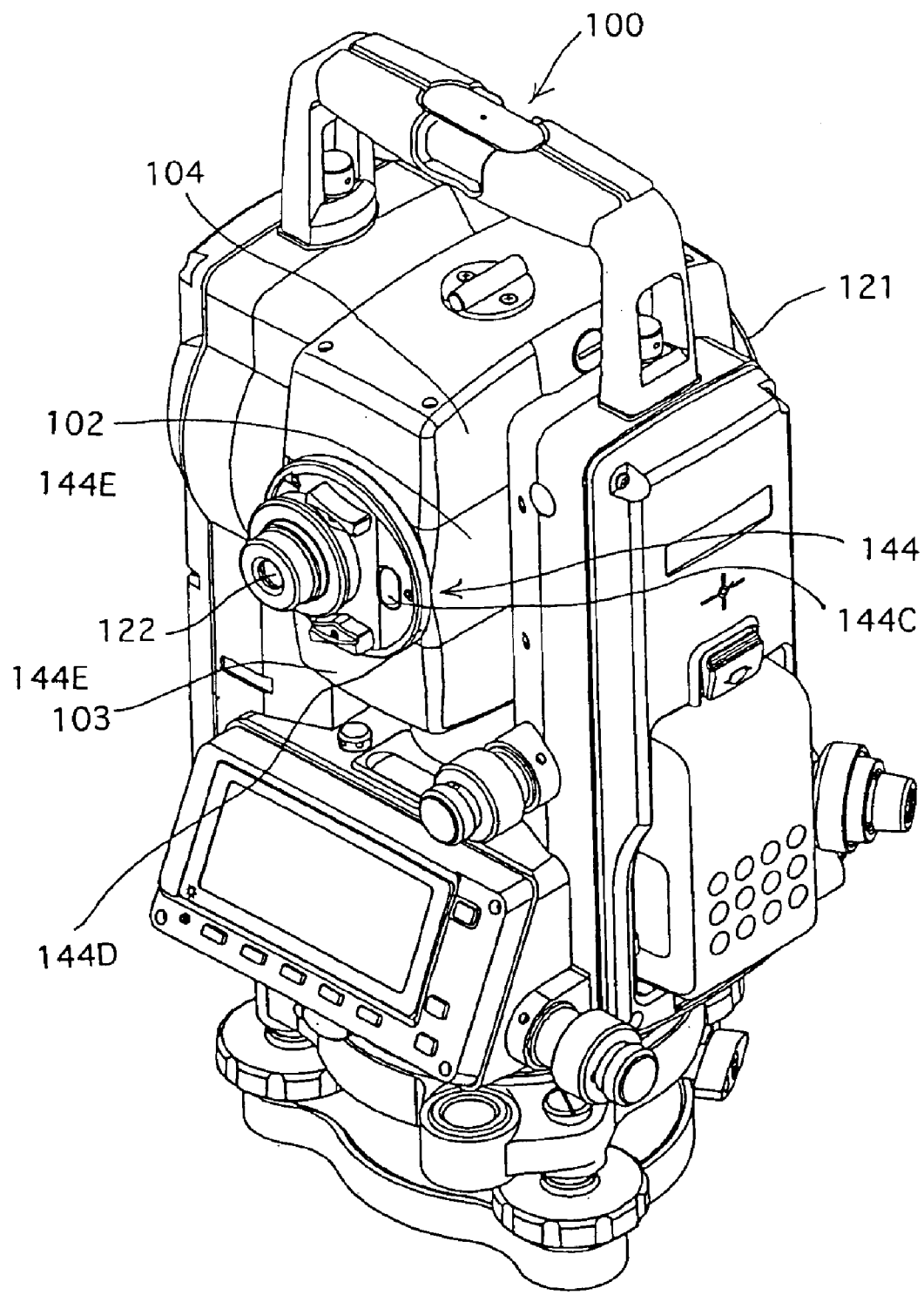
FIG. 10 is a perspective view of the third embodiment of the total station equipped with an autofocus system, according to the present invention.
Figure 11:
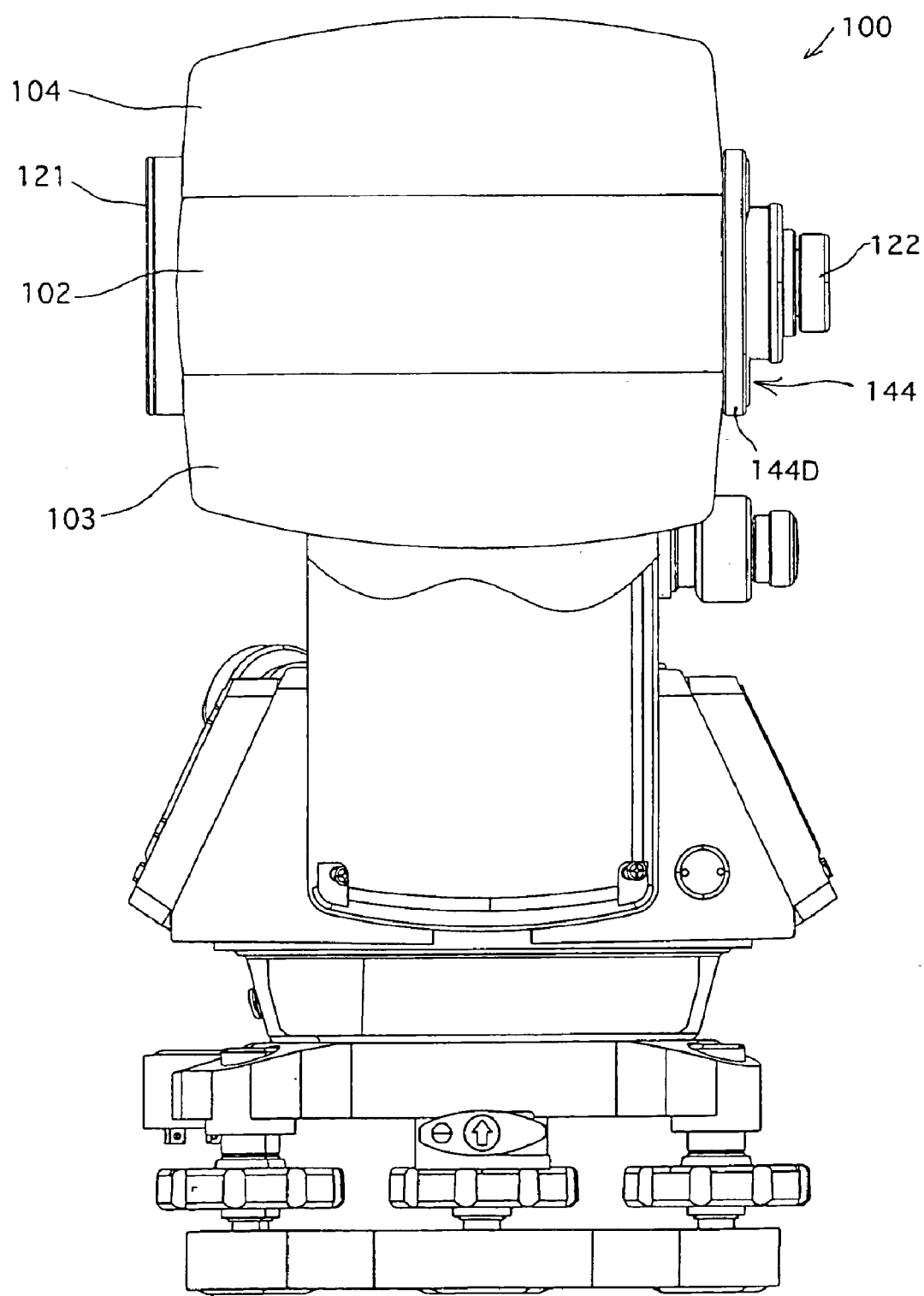
FIG. 11 is an elevational side view of a fundamental portion of the total station shown in FIG. 10.

Distance stakeout measurement operation performed on a consecutive basis with the total station 1' shown in FIG. 7 will be hereinafter discussed with reference to the flow chart shown in FIG. 8.

Firstly, the specified distance and other design data that are necessary for the consecutive distance stakeout measurement operation are input to the controller 5 via the design value input device 7A and the measured distance input device 7B (step SB1). It should be noted that an appropriate measurement mode needs to be selected by the operator in advance before the operation at step SB1 when a stakeout operation such as distance stakeout measurement, coordinate stakeout measurement, lot staking measurement or width stakeout measurement is performed.

Subsequently, a tracking distance measurement mode (consecutive distance measurement mode) is selected at the push of the distance measurement start button 51 (step SB2). Upon the push of the distance measurement start button 51, a tracking distance measurement operation and the consecutive autofocus operation start at the same time. With these operations, the measured distance value is determined immediately after the measuring light reflected by a target returns to the total station 1', while the measured distance and the deviation between the input design value (specified distance ) and the measured distance to the target are indicated on the indicating device 8.

Subsequently, a sighting operation is performed when the sighting telescope is not aimed at the target. The sighting operation continues to be performed until the tracking distance measurement operation or the consecutive autofocus operation stops (step SB3). In the sighting operation, the operator tracks the target by manually aiming the sighting telescope at the target (the sighting object) so that the optical axis of the sighting telescope is generally in line with the target while viewing the target through a collimator (not shown) which is attached to the sighting telescope. Namely, in the present embodiment, the operator sights the target with the optical axis of the sighting telescope being generally in line with the target. If the sighting telescope is in an in-focus state on the target, the operator manually operates the sighting telescope to sight the center of the target via the sighting telescope.

After the operation at step SB2, it is determined whether the target is in focus (step SB4). This operation at step SB4 is performed each time the autofocus process, which is performed repetitively by the autofocus system 4, is performed. If it is determined that the target is not in focus, control proceeds to step SB5. If it is determined that the target is in focus, control proceeds to step SB6.

At step SB5, the controller 5 actuates the lens driver 45 to move the focusing lens 22 to a predetermined position in advance to bring an object at the corresponding design distance that is stored in the default-distance setting device 54 into focus before the subsequent autofocus operation is performed.

At step SB6, it is checked whether the measured distance value has been determined. If it is determined at step SB6 that the measured distance value has not yet been determined, control proceeds to step SB8. The operation at step SB6 is performed repeatedly until it is determined at step SB6 that the measured distance value has been determined unless a distance measurement stop button (not shown) is depressed, since the measured distance value is determined immediately after the measuring light reflected by the target returns to the total station 1' while the sighting operation is being performed.

If it is determined at step SB6 that the measured distance value has been determined, the measured distance and the deviation between the input design value (specified distance) and the measured distance to the target are indicated on the indicating device 8 (step SB7).

As a result, the operator can identify the deviation between the current location of the target and a staking point by looking at the indicating device 8. This makes it possible for the operator of the total station 1 to guide the person who holds the target to move the target in accordance with the deviation. Thereafter, at the moment the deviation indicated on the indicating device 8 becomes zero, the stakeout operation in which the target is staked out at a staking point is completed. Accordingly, after the operation at step SB7, it is determined whether the distance measurement stop button (not shown) is depressed (step SB8). If the distance measurement stop button is depressed during the sighting operation, control proceeds to step SB9 and the tracking distance measurement operation and the consecutive autofocus operation are terminated. Otherwise, control returns to step SB4 from step SB8 to repeat the operations from step SB4 to step SB8.

As can be understood from the foregoing, according to each of the above described first and second embodiments of the total stations, the distance data and the positional data (AF sensor data) are selectively effectively utilized and are supplementary to each other. Therefore, the sighting object can be brought into focus reliably and precisely even if the sighting object is like a white wall having no contrast, to thereby minimize the chances that the autofocus operation may end in failure. This increases the reliability of the autofocus system, and consequently makes it possible to complete the stakeout operation promptly.

In an conventional total station, when a distance measuring operation is carried out without a prism, there is a possibility that the measuring point may not be identified clearly or may be misidentified. However, according to each of the above described first and second embodiments of the total station, the measuring point can be reliably brought into focus without a prism under various conditions. This increases the reliability of the total station.

Furthermore, according to each of the above described first and second embodiments of the total station, in the case where the tracking distance measurement mode in which such an operation as the distance stakeout measurement operation is performed is set, the consecutive autofocus operation starts at the same time the distance stakeout measurement operation starts. Therefore, it is no longer necessary to push an AF start button, which makes it possible for the operator of the total station to focus his/her energy on carrying out the sighting operation. Consequently, the stakeout operation can be completed promptly.

FIGS. 10 through 15 show the third embodiment of the total station equipped with an autofocus system. The total station 100, which is mounted on a tripod (not shown) when used, is provided with a sighting telescope (a sighting telescope optical system) 102, a distance measuring system (EDM) 103, an angle measuring system (not shown) and a detachable AF drive unit (an AF system) 104.

Figure 13:
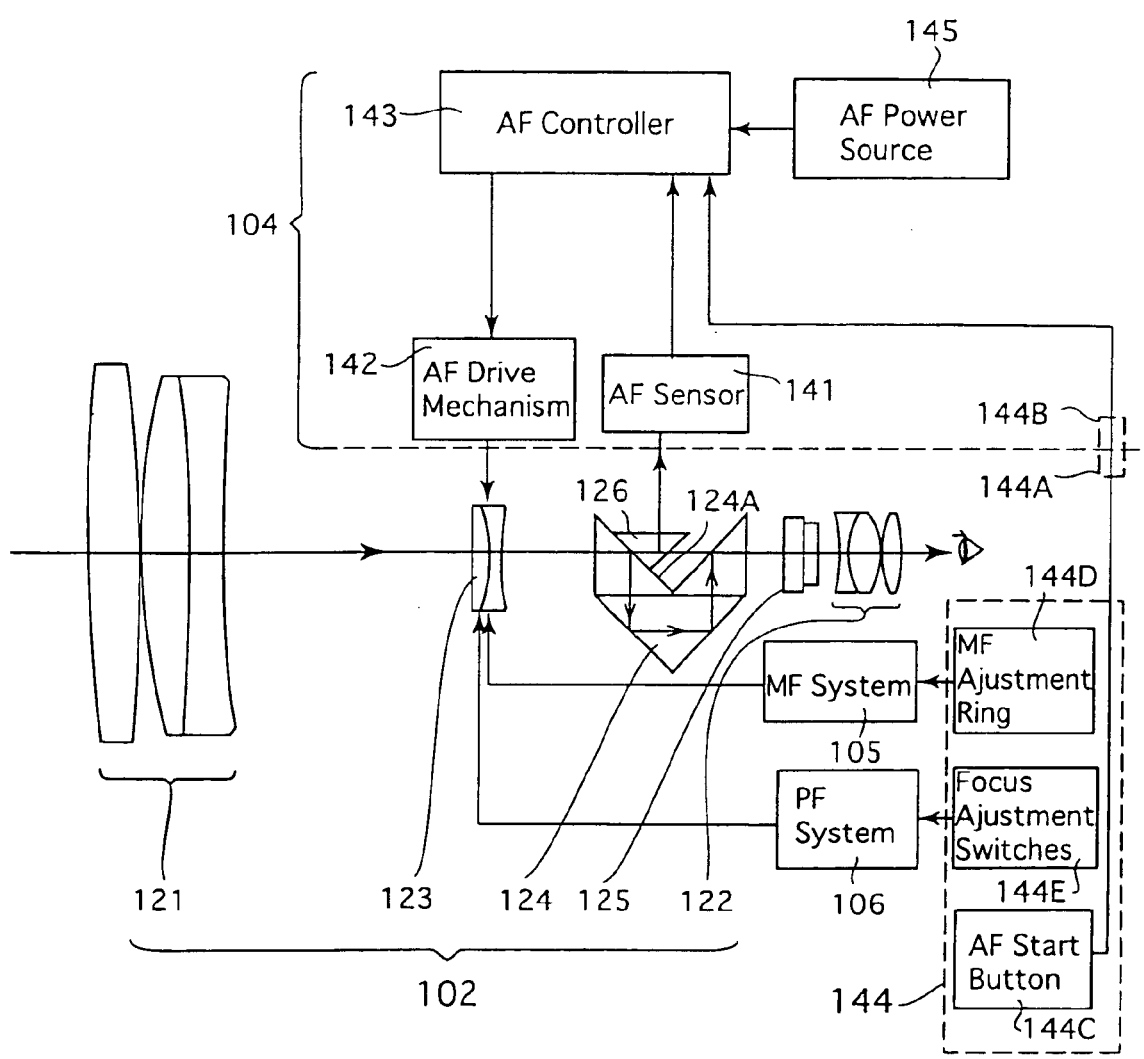
FIG. 13 is a schematic diagram of fundamental elements of the AF drive unit and fundamental elements of the sighting telescope.

As shown in FIG. 13, the sighting telescope 102 includes an objective lens 121, a focusing lens (focus adjustment lens) 123, a Porro-prism erecting system (erecting optical system) 124, a focal-plane plate (reticle plate) 125, and an eyepiece lens 122, in that order from the object side (i.e., left to right as shown in FIG. 13).

The focusing lens 123 is guided in a direction of the optical axis thereof. The axial position of the focusing lens 123 is automatically adjusted via an AF drive mechanism 142 provided in the AF drive unit 104 in accordance with the distance to a sighting object to focus the image of the sighting object that is formed through the objective lens 121 on the front surface (the surface facing the objective lens 121) of the focal-plane plate 125. Accordingly, the image of the sighting object can be precisely focused on the front surface of the focal-plane plate 125 by automatically adjusting the axial position of the focusing lens 123 in accordance with the distance to the sighting object. The operator sights a magnified image of the sighting object, which is focused on the focal-plane plate 125, via the eyepiece 122. The focusing lens 123 is moved along the optical axis thereof either automatically via the AF drive mechanism 142, or manually via a manual focus (MF) system 105, or a motorized power focus system (i.e., a motorized manual focus system/P.F system) 106. Therefore, the focusing lens 123 can be driven via the manual focus system 105 or the motorized power focus system 106 even if the AF drive unit 104 is dismounted from top of the sighting telescope 102.

A beam splitting prism (a beam splitting optical member/light guide) 126 is adhered to a specific inclined surface 124A of the Porro-prism erecting system 124 so that part of the light which enters the Porro-prism erecting system 124 enters the beam splitting prism 126 to be reflected thereby to be incident upon an AF sensor 141 (see FIG. 13).

The focal-plane plate 125 is provided thereon with a reticle (cross hair), which is known in the art.

Figure 14:
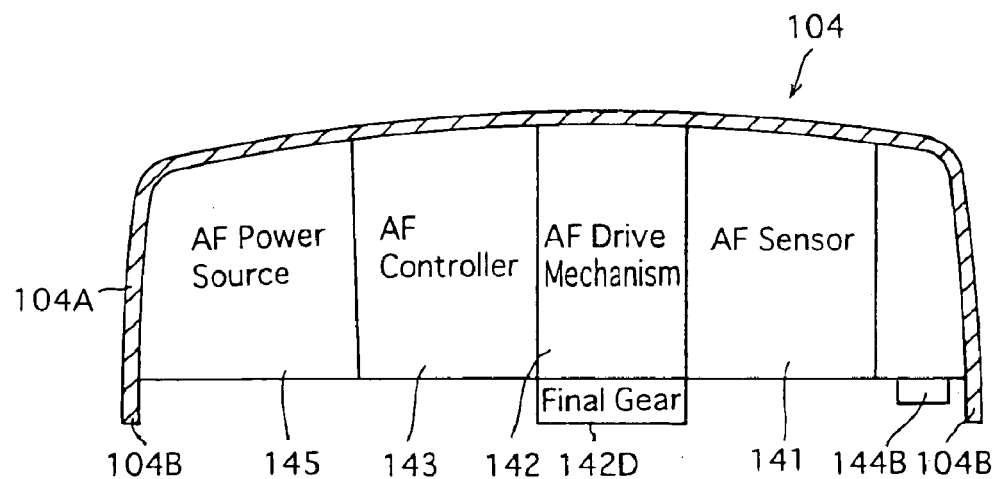
FIG. 14 is a schematic diagram of the internal structure of the AF drive unit.
Figure 15:
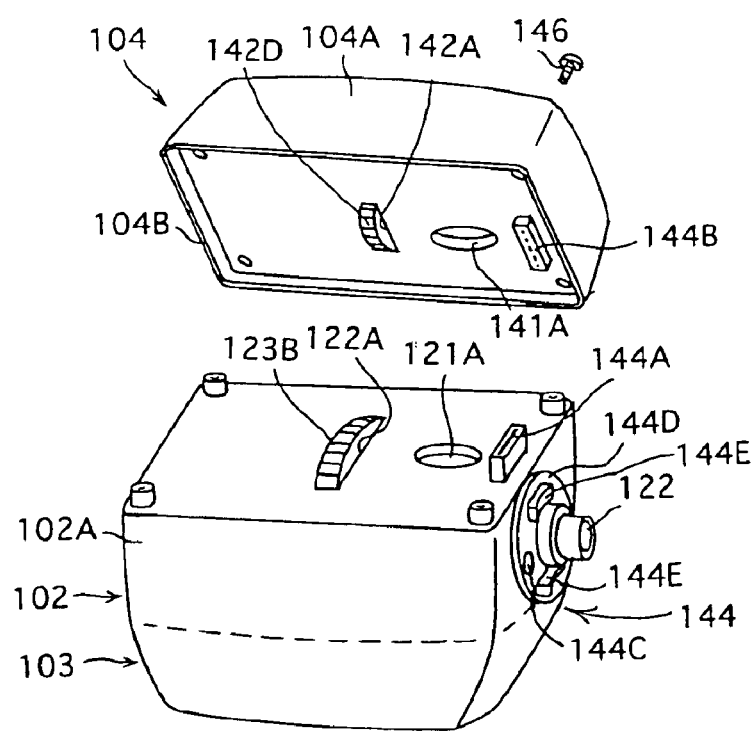
FIG. 15 is a perspective view of a fundamental portion of the total station shown in FIG. 10, showing a state where the AF drive unit is dismounted from top of a block which includes the sighting telescope and a distance measuring system.

As shown in FIG. 15, the AF drive unit 104 is designed so as to be dismountably mounted to top of a housing 102A of the sighting telescope 102 via four set screws 146 (only one is shown in FIG. 15). As shown in FIG. 14, the AF drive unit 104 is provided in a housing 104A thereof with an AF sensor (e.g., a pair of multi-segment CCD line sensors) 141, an AF drive mechanism 142 an AF controller 143, and an AF power source 145. In a state where the AF drive unit 104 is properly mounted to the housing 102A of the sighting telescope 102, the AF sensor 141 is optically in alignment with the sighting telescope optical system 102 positioned in the housing 102A, the AF drive mechanism 142 is mechanically connected to the focusing lens 123, and the AF controller 143 is electrically connected to an AF start button 144C of a focus control portion 144 via male and female connectors 144A and 144B.

The AF sensor 141 receives part of the light which enters the Porro-prism erecting system 124 from the sighting object to attain information on the focal point of the sighting telescope with respect to the sighting object. In the third embodiment of the sighting telescope, part of the light which enters the Porro-prism erecting system 124 is led to the photosensitive surface (not shown) of the AF sensor 141 via the beam splitting prism 126. The AF sensor 141 detects the focus state (e.g., a front focus or a rear focus) on a reference focal plane (not shown) which is located at a position optically equivalent to the position at which the reticle of the focal-plane plate 125 is placed. The AF controller 143 calculates an amount of defocus and direction of the focal shift through a predetermined defocus operation in accordance with AF sensor data (focal-point positional data) output from the AF sensor 141. With the calculated amount of defocus and direction of the focal shift, the focusing lens 123 can be moved to an in-focus position with respect to the sighting object.

In a state where the AF drive unit 104 is properly mounted to the housing 102A of the sighting telescope 102, the light bundle which emerges from an exit surface of the beam splitting prism 126 is incident on a photosensitive surface (not shown) of the AF sensor 141 via two openings (first aperture) 121A and (second aperture) 141A which are respectively formed on a top plate of the housing 102A and a bottom plate of the housing 104A (see FIG. 15). The openings 121A and 141A are aligned when the AF drive unit 104 is properly mounted to the housing 102A of the sighting telescope 102. The openings 121A and 141A and the beam splitting prism 126 constitute a light guide. Alternatively, the light bundle which emerges from the exit surface of the beam splitting prism 126 can be incident on the photosensitive surface of the AF sensor 141 via a conventional optical coupler (light guide) using detachable connectors or plugs.

Figure 12:
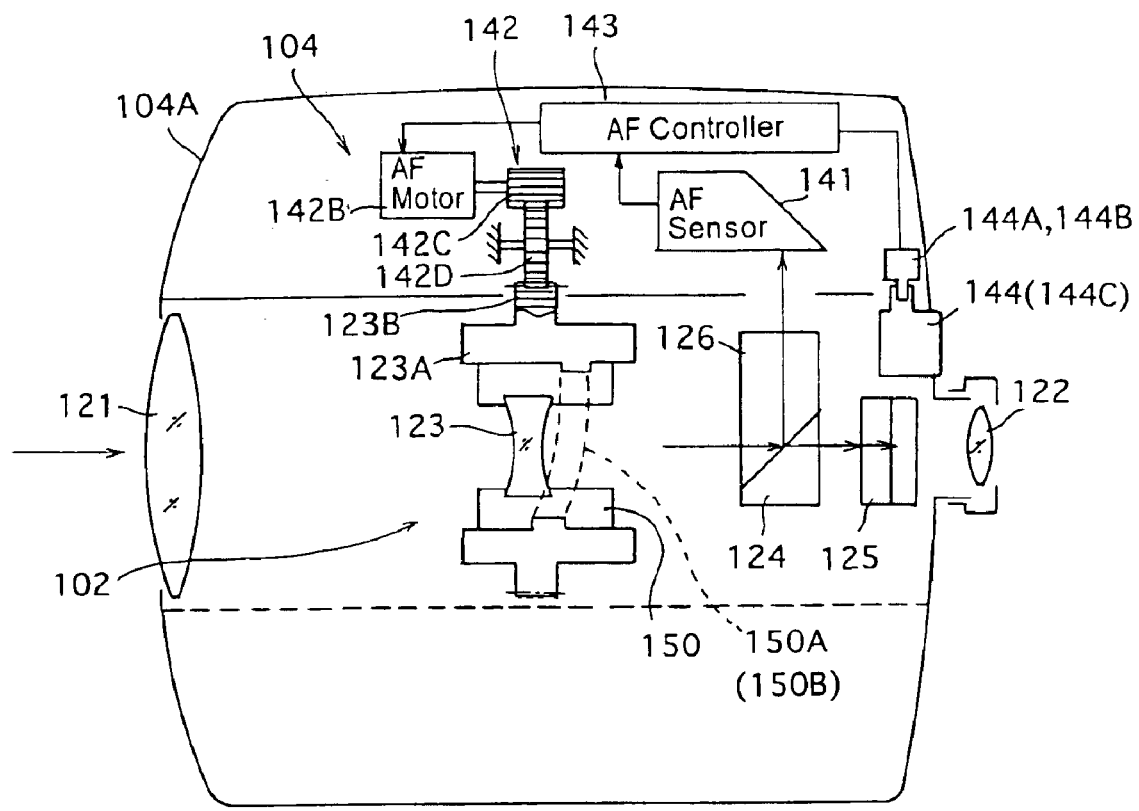
FIG. 12 is a schematic diagram of a fundamental portion of the total station shown in FIG. 10, showing a state where an AF drive unit is mounted to the body of the sighting telescope.

As shown in FIG. 12, the AF drive mechanism 142 is provided with an AF motor 142B, a drive gear 142C which is fitted fixedly on the drive shaft of the AF motor 142B, and a gear train including a first gear (not shown) and a final gear (first gear) 142D. In FIG. 12, among all the gears of the gear train, only the final gear 142D is shown. The first gear of the gear train is engaged with the drive gear 142C, while the final gear 142D of the gear train is engaged with a circumferential gear (second gear) 123B formed on a rotatable lens barrel 123A. The final gear 142D partly projects downwardly outwards from the bottom plate of the AF drive unit 104 via a rectangular opening 142A formed on the bottom plate of the AF drive unit 104 (see FIG. 15). The housing 102A of the sighting telescope 102 is provided on the top plate of the housing 102A with a corresponding rectangular opening 122A via through which the circumferential gear 123B of the rotatable lens barrel 123A partly projects externally upward from the top plate of the housing 102A to be engaged with the final gear 142D. The final gear 142D and the circumferential gear 123B constitute a driving force transmitting device which transmits a driving force generated by the AF drive mechanism to the focusing lens group.

As shown in FIGS. 14 and 15, the housing 104A is provided along the bottom edge with an annular projecting portion 104B to secure a space between the bottom plate of the housing 104A and the top plate of the housing 102A so that the final gear 142D and the circumferential gear 123B can be engaged with each other in this space. The final gear 142D and the circumferential gear 123B constitute a mechanical coupler for coupling the AF drive mechanism 142 to the rotatable lens barrel 123A. Upon mounting the AF drive unit 104 onto the sighting telescope 102, the final gear 142D meshes with the circumferential gear 123B.

As shown in FIG. 12, the rotatable lens barrel 123A is slidably fitted on an inner barrel 150 which surrounds and holds the focusing lens 123. The inner barrel 150 is guided linearly along the optical axis of the focusing lens 123 via a conventional guiding mechanism. The rotatable lens barrel 123A is provided on an inner peripheral surface thereof with a female helicoidal thread 150A, while the inner barrel 150 is provided on an outer peripheral surface with a male helicoidal thread 150B which meshes with the female helicoidal thread 150A. Therefore, rotating the rotatable lens barrel 123A causes the inner barrel 150 to move along the optical axis of the focusing lens 123 relative to the rotatable lens barrel 123A, which makes it possible to adjust the axial position of the focusing lens 123 so as to bring the sighting object into focus. Accordingly, the focus lens 123 is driven to move along the optical axis thereof by rotation of the AF motor 142B.

Although the circumferential gear 123B of the rotatable lens barrel 123A partly projects externally upward from the top plate of the housing 102A in the third embodiment, the sighting telescope 102 can be designed so that the circumferential gear 123B does not project externally upward from the top plate of the housing 102A. According to this design, the rectangular opening 122A only has to be closed by an appropriate simple covering member (not shown) when the total station 100 is produced as a total station without the AF drive unit 104.

The AF controller 143 calculates the amount of defocus in accordance with the AF sensor data output from the AF sensor 141 to move the focusing lens 123 to an in-focus position thereof with respect to the sighting object, and at the same time performs a distance measuring operation to measure the distance to the sighting object with the use of the AF sensor data when necessary. The AF controller 143 performs the autofocus operation at the push of the AF start button 144C of the focus control portion 144 provided at the rear of the housing 102A of the sighting telescope 102 around the eyepiece lens 122 (see FIG. 15). In the third embodiment of the sighting telescope, the focus control portion 144 is provided at the rear of the housing 102A, i.e., on a portion of the body of the total station 100. The focus control portion 144 includes the AF start button 144C, a manual focus adjustment ring 144D and a pair of focus adjustment switches (hand-operated members) 144E. As shown in FIG. 13, the AF start button 144C is electrically connected to the AF controller 143 via connecting male and female connectors 144A and 144B which are provided on the housings 102A and 104A, respectively. The pair of focus adjustment switches 144E are connected to the motorized power focus system 106 for driving the focusing lens 123 in the optical axis direction. The AF controller 143 is positioned in the housing 104A of the AF drive unit 104, and controls the operation of the AF motor 142B of the drive mechanism 142. However, the AF controller 143 can be modified so as to control both the operation of the AF motor 142B and the operation of the distance measuring system 103. In this case, the AF controller 143 can be positioned in the housing of the distance measuring system 103 or in other appropriate space in the main body of the sighting telescope 100.

Figure 16:
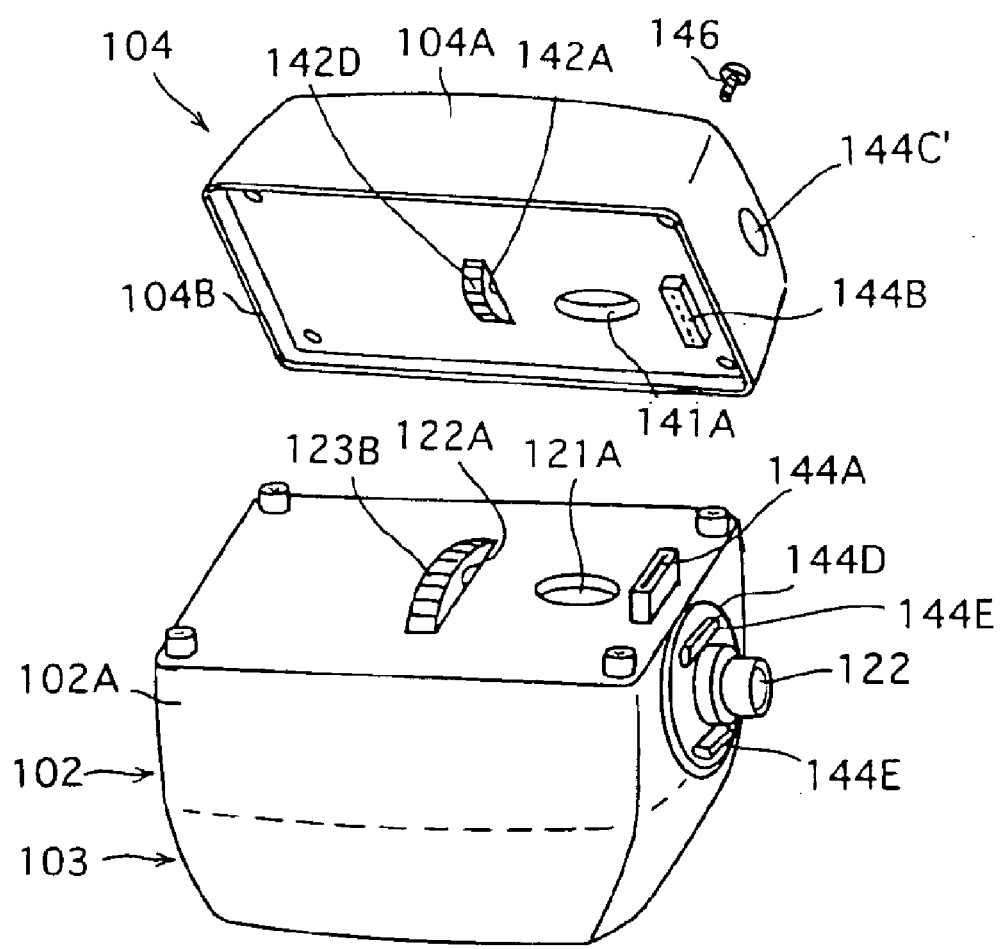
FIG. 16 is a perspective view of another embodiment of the fundamental portion shown in FIG. 15, showing a state where the AF drive unit is dismounted from top of the block which includes the sighting telescope and the distance measuring system.

Although the AF start button 144C, which is depressed by the operator to actuate the AF motor 142B of the AF drive system 104 to bring the sighting object into focus automatically, is arranged on the focus control portion 144 together with other control buttons or switches (e.g. pair of focus adjustment switches 144E) in consideration of operability, the AF start button 144C can be arranged on the housing 104A of the AF drive unit 104 in a manner shown in FIG. 16. FIG. 16 shows another embodiment of a fundamental portion of the total station 100 wherein an AF start button 144C' which corresponds to the AF start button 144C is provided on the housing 104A of the AF drive unit 104. In this embodiment, the manual focus adjustment ring 144D and the pair of focus adjustment switches 144E are provided on the housing 102A of the sighting telescope 102 in consideration of the case where the total station 100 is used without the AF drive unit 104. The pair of focus adjustment switches 144E are manually operated to move a PF motor (not shown) provided in the housing 102A forwardly and reversely via the motorized power focus system 106.

The AF power source 145 that is provided in the housing 104A of the AF drive unit 104 includes a battery which is used exclusively by the AF drive unit 104 (i.e., by the AF motor 142B and the AF controller 143). Namely, the battery of the AF power source 145 is independent of another battery (not shown) which is accommodated in the body of the total station 100 to serve as the main power source of the total station 100. Accordingly, the AF drive unit 104 can function even if the battery of the total station 100 which serves as the main power source thereof goes dead. The AF power source 145 can be omitted in the AF drive unit 104 if the total station 100 is modified so that the battery accommodated in the body of the total station 100 supplies power to the AF drive unit 104. In this case, it is of course necessary to provide the total station with a power supply line for supplying power from the battery accommodated in the body of the total station 100 to the AF drive unit 104 via appropriate connectors or the like.

As can be understood from the foregoing, according to the above described third embodiment of the surveying instrument equipped with an autofocus system, the AF drive unit 104 is provided independent of the body of the total station 100, and can be simply connected electrically, optically and mechanically to the body of the total station 100 via set screws 146. Therefore, when one type of surveying instrument equipped with an autofocus system and another type of surveying instrument equipped with no autofocus system are manufactured, these two types of surveying instruments can share the great number of components to thereby reduce the cost of production. Accordingly, the manufacturer can, provided such two types of surveying instruments at low prices. Furthermore, the AF drive unit can be removed if necessary when the total station is carried from one place to another, which facilitates transportation of the total station.

Furthermore, the operator can remove the AF drive unit from the body of the total station as circumstances demand, which facilitates the versatility of the total station. As can be understood from the above descriptions, according to the third embodiment of the surveying instruments equipped with an autofocus system, a surveying instrument equipped with an autofocus system which can be checked up or repaired easily promptly with the autofocus system being removed from the body of the surveying instrument if necessary according to the circumstances is achieved. Furthermore, one type of surveying instrument equipped with an autofocus system and another type of surveying instrument which is not equipped with an autofocus system can be manufactured easily with a low cost of production.

The present invention can be applied to not only a total station having both a distance measuring system and an angle measuring system but also an electronic distance meter having a distance measuring system but having no angle measuring system.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument comprising:
   a sighting telescope through which a sighting object can be sighted; and
   an AF drive unit which is provided separately from said sighting telescope, wherein said AF drive unit can be mounted to and dismounted from a body of said surveying instrument;
   said AF drive unit including:
   a sensor which receives part of a light bundle which is passed through an objective lens of said sighting telescope;
   a drive mechanism which drives a focusing lens group of said sighting telescope along an optical axis thereof;
   a controller which inputs sensor data output from said sensor to control the operation of said drive mechanism in accordance with said input sensor data so as to focus said sighting telescope on said sighting object; and
   a driving force transmitting device which transmits a driving force generated by said drive mechanism to said focusing lens group in a state where said AF drive unit is mounted to said body of said surveying instrument.

2. The surveying instrument according to claim 1, further comprising a light guide, provided between said AF drive unit and said body of said surveying instrument, for guiding said part of said light bundle which is passed through said objective lens to said sensor.

3. The surveying instrument according to claim 2, wherein said light guide comprises a first aperture formed on said body of said surveying instrument and a second aperture formed on a body of said AF drive unit, said first aperture and said second aperture being aligned so that said part of said light bundle can travel from inside of said body of said surveying instrument to said sensor via said first and second apertures.

4. The surveying instrument according to claim 2, wherein said body of said surveying instrument comprises said sighting telescope;
   wherein said sighting telescope comprises an erecting optical system positioned behind said focusing lens group; and
   wherein said light guide comprises a beam splitting optical member attached to a surface of said beam splitting optical member.

5. The surveying instrument according to claim 4, wherein said erecting optical system comprises a Porro-prism.

6. The surveying instrument according to claim 1, wherein said AF drive unit comprises a focus control portion which is manually operated to control said operation of said drive mechanism.

7. The surveying instrument according to claim 6, wherein said focus control portion comprises an AF start button, said controller performing an autofocus operation upon said AF start button being depressed.

8. The surveying instrument according to claim 6, wherein said focus control portion is positioned in the vicinity of an eyepiece of said sighting telescope.

9. The surveying instrument according to claim 1, wherein at least one of said drive mechanism and said AF controller is supplied with power from a battery accommodated in said AF drive unit.

10. The surveying instrument according to claim 1, wherein said body of said surveying instrument comprises a manual focus system with which said focusing lens group can be manually moved to adjust a focal point of said sighting telescope.

11. The surveying instrument according to claim 1, wherein said body of said surveying instrument comprises a motorized manual focus system with which said focusing lens group can be manually moved by operating at least one hand-operated member to adjust a focal point of said sighting telescope.

12. The surveying instrument according to claim 1, wherein said body of said surveying instrument comprises said sighting telescope.

13. The surveying instrument according to claim 1, wherein said surveying instrument is a total station.

14. The surveying instrument according to claim 1, wherein said driving force transmitting device comprises:

a first gear provided in said AF drive unit, said first gear partly projecting out of said AF drive unit; and a second gear provided in said body of said sighting telescope;

wherein said first gear and said second gear mesh with each other in a state where said AF drive unit is mounted to said body of said surveying instrument.

15. The surveying instrument according to claim 14, wherein said second gear partly projects out of said body of said surveying instrument.

* * * * *